(12) United States Patent
Gabriel et al.

(10) Patent No.: US 10,932,444 B2
(45) Date of Patent: *Mar. 2, 2021

(54) AUTOMATIC FLUID DELIVERY SYSTEMS AND METHODS

(71) Applicant: Hydropac/Lab Products, Inc., Seaford, DE (US)

(72) Inventors: George S. Gabriel, Laurel, DE (US); Neil E. Campbell, Eden, MD (US); Rodney E. Gerringer, Forest Hill, MD (US); Lynn B. Irwin, Laurel, DE (US); Edward K. Eldreth, Port Deposit, MD (US)

(73) Assignee: Hydropac/Lab Products, Inc., Seaford, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,689

(22) Filed: Mar. 13, 2020

(65) Prior Publication Data

US 2020/0267930 A1    Aug. 27, 2020

Related U.S. Application Data

(63) Continuation of application No. 16/359,002, filed on Mar. 20, 2019, which is a continuation of application
(Continued)

(51) Int. Cl.
*A01K 7/06* (2006.01)
*A01K 1/03* (2006.01)
(Continued)

(52) U.S. Cl.
CPC ............... *A01K 7/06* (2013.01); *A01K 1/031* (2013.01); *A01K 39/0213* (2013.01);
(Continued)

(58) Field of Classification Search
CPC . A01K 1/031; A01K 7/00; A01K 7/06; A01K 39/01; B01D 29/11; B01D 29/01
See application file for complete search history.

(56) References Cited

U.S. PATENT DOCUMENTS 3,550,560 A    12/1970   Edstrom
3,566,844 A    3/1971    Occhiodori et al.
(Continued)

OTHER PUBLICATIONS

Office Action dated Feb. 2, 2016 in U.S. Appl. No. 14/149,375.
(Continued)

*Primary Examiner* — Michael H Wang
(74) *Attorney, Agent, or Firm* — Stroock & Stroock & Lavan LLP

(57) ABSTRACT

A fluid delivery system for delivering a fluid from an automatic water source to animals housed in cages in high density caging systems may comprise a fluid delivery valve assembly, wherein the fluid delivery valve assembly is adapted to be coupled to the automatic water source to facilitate the provision of fluid to animals housed in the cages. The fluid delivery valve assembly may further comprise a valve body and end cap, which may be joined together, that define a fluid channel. The fluid delivery valve assembly may further comprise sealing elements, a spring element, and an interior stem disposed at least in part in the fluid channel to open and close the fluid channel.

17 Claims, 49 Drawing Sheets

Related U.S. Application Data

No. 15/587,820, filed on May 5, 2017, now Pat. No. 10,238,086, which is a continuation-in-part of application No. 13/836,187, filed on Mar. 15, 2013, now Pat. No. 9,732,882.

(51) Int. Cl.
*B01D 29/11* (2006.01)
*A01K 39/02* (2006.01)
*B62B 3/00* (2006.01)

(52) U.S. Cl.
CPC .......... *B01D 29/11* (2013.01); *A47B 2200/06* (2013.01); *B62B 3/006* (2013.01); *B62B 2202/42* (2013.01); *B62B 2204/00* (2013.01); *B62B 2204/02* (2013.01); *F24F 2221/52* (2013.01)

(56) References Cited

U.S. PATENT DOCUMENTS

| | | |
|---|---|---|
| 3,581,713 A | 6/1971 | Crooks |
| 3,698,431 A | 10/1972 | Thompson |
| 3,965,864 A | 6/1976 | Beltz |
| 4,370,948 A | 2/1983 | Atkins |
| 4,402,343 A | 9/1983 | Thompson et al. |
| 4,406,253 A | 9/1983 | Atchley et al. |
| 4,637,345 A | 1/1987 | Hostetler |
| 4,660,509 A | 4/1987 | Steudler, Jr. |
| 4,819,585 A | 4/1989 | Dolan et al. |
| 4,896,629 A | 1/1990 | Johnson |
| 5,003,927 A | 4/1991 | Thompson |
| 5,065,700 A | 11/1991 | Cross |
| 5,154,138 A | 10/1992 | Siddiqui et al. |
| 5,253,842 A | 10/1993 | Huebscher et al. |
| 5,337,696 A | 8/1994 | Edstrom et al. |
| 5,363,802 A | 11/1994 | Huff |
| 5,501,177 A | 3/1996 | Edstrom, Sr. et al. |
| 5,544,858 A | 8/1996 | Rogers et al. |
| 5,823,144 A | 10/1998 | Edstrom, Sr. et al. |
| 5,865,144 A | 2/1999 | Semanuk |
| 6,003,468 A | 12/1999 | Edstrom, Sr. et al. |
| 6,026,988 A | 2/2000 | Teetsel et al. |
| 6,058,881 A | 5/2000 | Thompson |
| 6,073,584 A | 6/2000 | Schumacher |
| 6,339,998 B1 | 1/2002 | Niki et al. |
| 6,382,589 B1 | 5/2002 | Edstrom, Sr. et al. |
| 7,810,787 B2 | 10/2010 | Johnson |
| 7,937,836 B2 | 5/2011 | Gabriel et al. |
| 8,166,917 B2 | 5/2012 | Welbourne |
| 2005/0039691 A1 | 2/2005 | Jarke et al. |
| 2008/0087232 A1 | 4/2008 | Gabriel et al. |
| 2008/0190374 A1 | 8/2008 | Farris |
| 2008/0196670 A1 | 8/2008 | Clark |
| 2011/0315087 A1 | 12/2011 | Gabriel et al. |
| 2014/0261205 A1 | 9/2014 | Herring, II et al. |
| 2019/0383423 A1 | 12/2019 | Halstead et al. |

OTHER PUBLICATIONS

International Search Report and Written Opinion dated Dec. 5, 2014 in International Application No. PCT/US2014/030253.
"Injection Moulding", <https://en.wikipedia.org/wiki/Injection_moulding>.
"Polyethylene", <https://en.wikipedia.org/wiki/Polyethylene>.

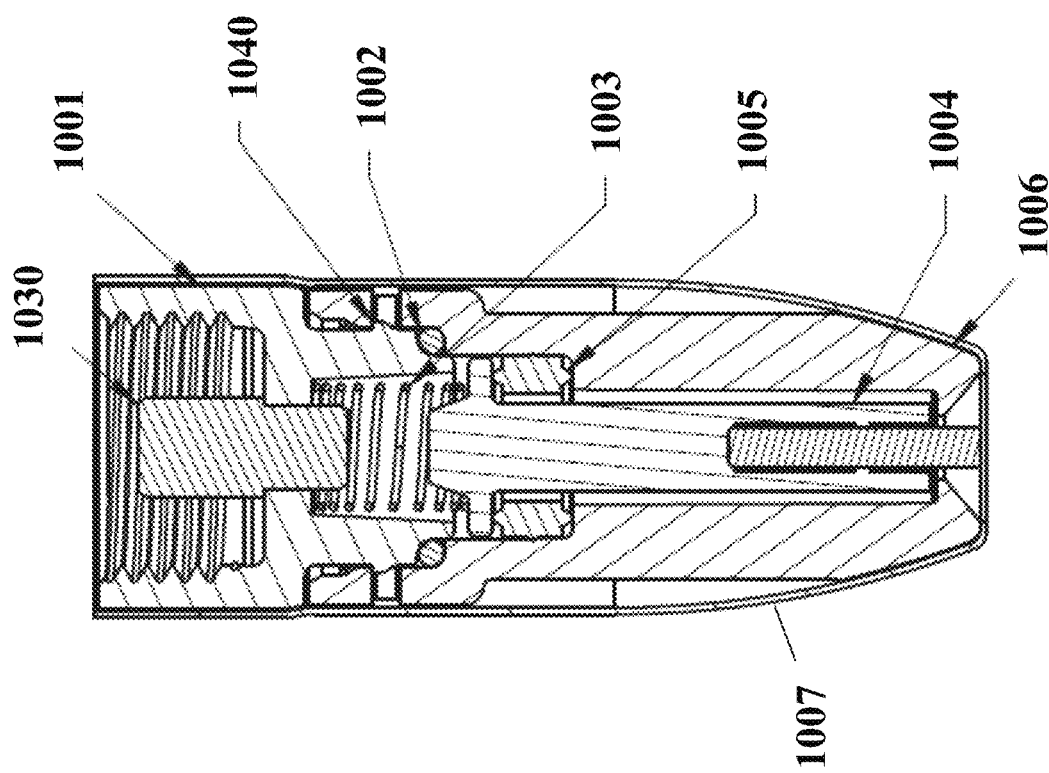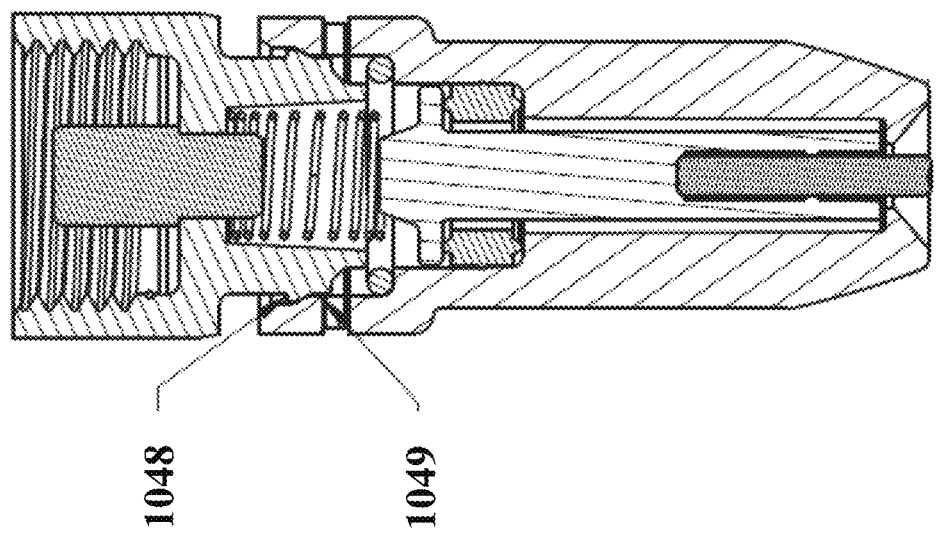

FIG. 59A  FIG. 59B
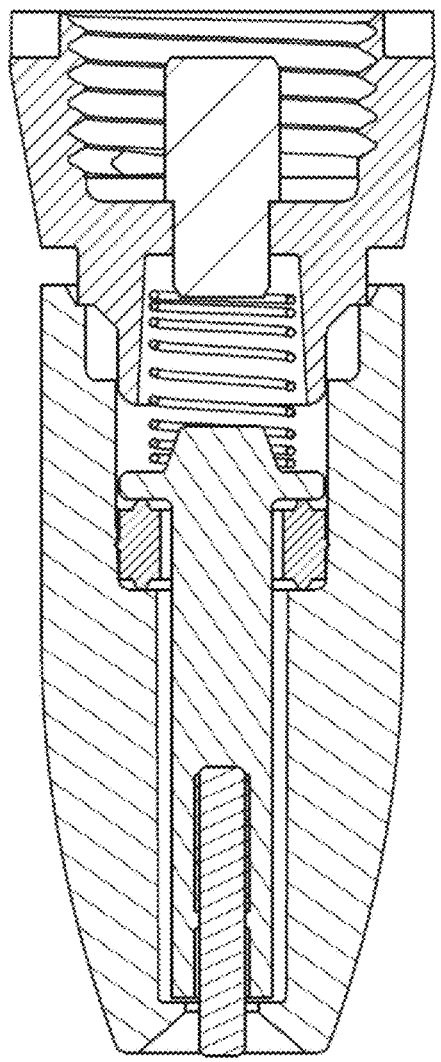
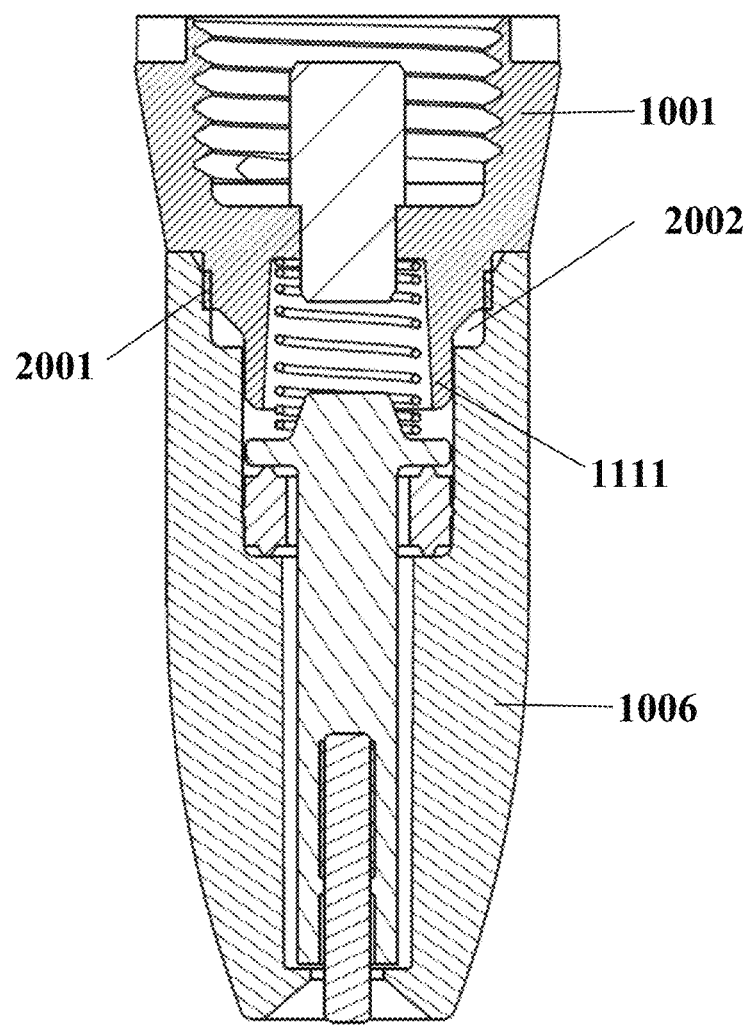

AUTOMATIC FLUID DELIVERY SYSTEMS AND METHODS

CROSS-REFERENCE TO RELATED APPLICATIONS

This application is a continuation of U.S. patent application No. 16/359,002, filed Mar. 20, 2019, which is a continuation of U.S. patent application No. 15/587,820, filed May 5, 2017, now U.S. Pat. No. 10,238,086, which is a continuation-in-part of U.S. patent application Ser. No. 13/836,187, filed Mar. 15, 2013, now U.S. Pat. No. 9,732,882, which is incorporated herein by reference in its entirety.

BACKGROUND OF THE INVENTION

Field of the Invention

The present invention relates generally to fluid delivery systems and in particular to automatic fluid delivery systems and methods for caging or storage systems for animals, such as ventilated laboratory rack systems.

Description of Related Art

A large number of laboratory animals are used every year in experimental research. These animals range in size from mice to non-human primates. To conduct valid and reliable experiments, researchers must be assured that their animals are protected from pathogens and microbial contaminants that will affect test results and conclusions. Proper housing and management of animal facilities are essential to animal well-being, to the quality of research data and teaching or testing programs in which animals are used, and to the health and safety of personnel.

Ordinarily, animals should have access to potable, uncontaminated drinking water or other needed nutrient containing fluids according to their particular requirements. Water quality and the definition of potable water can vary with locality. Periodic monitoring for pH, hardness, and microbial or chemical contamination might be necessary to ensure that water quality is acceptable, particularly for use in studies in which normal components of water in a given locality can influence the results obtained. Water can be treated or purified to minimize or eliminate contamination when protocols require highly purified water. The selection of water treatments should be carefully considered because many forms of water treatment have the potential to cause physiologic alterations, changes in microflora, or effects on experimental results. For example, chlorination of the water supply can be useful for some species but toxic to others.

Animal suppliers around the world have experienced an unprecedented demand for defined pathogen-free animals, and are now committed to the production and accessibility of such animals to researchers. Likewise, laboratory animal cage manufacturers have developed many caging systems that provide techniques and equipment to insure a pathogen free environment. For example, ventilated cage and rack systems are well known in the art. One such ventilated cage and rack system is disclosed in U.S. Pat. No. 4,989,545, the contents of which are incorporated herein by reference, assigned to Lab Products, Inc., in which an open rack system including a plurality of shelves, each formed as an air plenum, is provided. A ventilation system is connected to the rack system for ventilating each cage in the rack, and the animals therein, thereby eliminating the need for a cage that may be easily contaminated with pathogens, allergens, unwanted pheromones, or other hazardous fumes. It is known to house rats, for example, for study in such a ventilated cage and rack system.

The increasing need for improvement and technological advancement for efficiently, safely housing and maintaining laboratory animals arises mainly from contemporary interests in creating a pathogen-free laboratory animal environment and through the use of immuno-compromised, immuno-deficient, transgenic and induced mutant ("knock-out") animals. Transgenic technologies, which are rapidly expanding, provide most of the animal populations for modeling molecular biology applications. Transgenic animals account for the continuous success of modeling mice and rats for human diseases, models of disease treatment and prevention and by advances in knowledge concerning developmental genetics. Also, the development of new immuno-deficient models has seen tremendous advances in recent years due to the creation of gene-targeted models using knockout technology. Thus, the desire for an uncontaminated cage environment and the increasing use of immuno-compromised animals (i.e., SCID mice) has greatly increased the need for pathogen free sources of food and water. One of the chief means through which pathogens can be introduced into an otherwise isolated animal caging environment is through the contaminated food or water sources provided to the animal(s).

Accordingly, the need exists to improve and better maintain the health of research animals through improving both specialized caging equipment and the water delivery apparatus for a given cage. Related caging system technologies for water or fluid delivery have certain deficiencies such as risks of contamination, bio-containment requirements, DNA hazardous issues, gene transfer technologies disease induction, allergen exposure in the workplace and animal welfare issues.

Presently, laboratories or other facilities provide fluid to their animals in bottles or other containers that must be removed from the cage, disassembled, cleaned, sterilized, reassembled, and placed back in the cage. Additionally, a large quantity of fluid bottles or containers must be stored by the labs based on the possible future needs of the lab, and/or differing requirements based on the types of animals studied. This massive storage, cleaning and sterilization effort, typically performed on a weekly basis, requires large amounts of time, space and human resources to perform these repetitive, and often tedious tasks.

Further, glass bottles (and the handling thereof) can be dangerous and also relatively costly. Bottle washing machines, bottle fillers, wasted water, hot water, wire baskets to hold bottles, sipper tubes, rubber stoppers, the ergonomic concerns of removing stoppers, screw caps insertion of sipper tubes are all problems inherent to the use of water bottles to provide water to animals.

The human factors of handling wire baskets while loading and unloading bottles has led to industry wide back injuries, carpel wrist injury, and eye injury from broken glass and other human factor ergonomic risks. By some estimates, the cost of injury related costs to industry and the lost productivity in the workplace amount to millions of dollars annually.

In addition, the use of water bottles typically leads to large energy costs because the cleaning of the water bottles typically requires hot water heated to approximately 180 degrees F. and the washing of all of the components of the water bottles and caps with dangerous chemicals.

Certain previous improvements have related to providing non-contaminated, replaceable, disposable sources of fluid for laboratory animals. One such fluid delivery system is disclosed in U.S. Pat. No. 6,941,893, the contents of which are incorporated herein by reference, assigned to Lab Products, Inc., in which a fluid delivery valve assembly for delivering a fluid from a fluid bag to an animal caging system is provided.

However, cost-effective and hygienic systems and methods for providing fluid to animals housed in cage and rack systems using automatic water systems are still needed in the art.

SUMMARY

Automatic water systems are available; however, they are not ideal. Traditionally, stainless steel valves and manifolds are used in automatic water systems and such parts require constant purging of slime and buildup of mineral deposits. Moreover, the stainless steel parts, such as the watering valves, require periodic repair. When repair is required, typically the institution must send the valves to the manufacturer to repair. This in turn requires that the institution maintain a second set of valves (and other parts that require periodic repair) to use while the first set of valves is being repaired. This adds significantly to the institution's costs.

Moreover, watering valves tend to fail due to time and/or use conditions, which endangers the laboratory animals and laboratory studies. For example, laboratory animals may cause bedding material to enter into watering valves, thereby jamming the valve. This either prevents water flow to the animal cage or, more likely, causes the valve to remain in the open (flow) position, which floods the cage, possibly causing animal death. Valves also deteriorate over time, which may cause water leakages to occur. Water leaks can endanger the laboratory animals and compromise a study because damp cages or damp materials around a cage can cause excessive humidity, which can cause hypothermia in the laboratory animals.

As such, a need exists for improved systems and methods for automatically delivering fluid to laboratory animals living in cage level barrier-type rack and cage systems. Specifically, there is a need to provide automatic watering devices, systems, and methods that are cost effective, require minimal maintenance, are resilient to environmental factors, and minimize dangers to laboratory animals and laboratory studies.

The present invention satisfies these needs. Briefly stated, in accordance with an embodiment of the invention, an automatic fluid delivery system for delivering a fluid to an animal caging system for housing an animal is described. The fluid delivery system may comprise a fluid delivery valve assembly adapted to be coupled to an automatic water system. Without limitation, the fluid delivery valve assembly may be made of replaceable materials, such as an injection moldable plastic (or similar compound now known or later developed). By advantageously using valve assemblies that may be replaceable, the invention may minimize the need for the use of traditional stainless steel watering valves.

The fluid delivery valve assembly is adapted to be used with a pressurized facility treated water source, such as automatic watering systems provided in ventilated housing units. In such applications, valve assemblies and related components (e.g., for connecting to the water manifold) that may be made of semi-permanent or replaceable materials provide the same benefits as discussed above.

The automatic fluid delivery system may be utilized in a single cage or in multiple cages integrated into ventilated cage and rack systems known in the art. An embodiment of the invention described herein provides for a fluid delivery system for delivering a fluid from an automatic water system to an animal caging system for housing an animal and may comprise a fluid delivery valve assembly, wherein the fluid delivery valve assembly is adapted to be connected to an automatic water source (such as a pipe) to facilitate the providing of the fluid to an animal in the caging system.

An exemplary embodiment of the invention may provide for a cage-mounted water delivery system that may be implemented in cage and rack systems to work with automatic water systems. The cage-mounted water delivery system includes a valve assembly, one or more sealing elements, and a valve stem designed and constructed to be coupled to the valve assembly to attached the valve assembly to a grommet provided in an animal cage.

An exemplary embodiment of the cage-mounted automatic water system valve assembly may include a valve body, an interior stem, and an end cap having a jam-preventing opening to prevent animal bedding from jamming the valve assembly. The valve assembly preferably defines a fluid channel therethrough. The valve assembly may further include one or more sealing elements (such as an O-ring) and a spring element disposed within the fluid channel, wherein the spring element abuts the interior stem and valve body to apply a biasing force between the valve stem and valve body to close (or seal) the valve assembly. The valve assembly may further function in connection with a quick disconnect element, saddle fitting, and a water supply manifold to provide water to animals housed in rack and cage systems from an automatic water system.

An exemplary embodiment of the invention is directed to a cage-mounted system for facilitating the delivery of water to a plurality of cage level barrier-type cages disposed at a laboratory facility site, for housing animals for an animal study. The system may comprise a valve assembly, a valve stem, a quick disconnect element, and a saddle fitting to facilitate the delivery of water from an automatic water system to the animals.

In some embodiments, the invention provides a valve assembly for delivering a fluid from an automatic water system to a cage in an animal caging system for housing one or more animals, comprising: a valve body and an end cap joined together with a first sealing element therebetween to define distal and proximal portions, respectively, of a fluid channel through the valve assembly; and a spring element, an interior stem, and a second sealing element disposed within the valve body and the end cap and in the fluid channel to open and close the valve assembly, wherein the valve body and the end cap comprise injection molded plastic and are formed with complementary features on their mating ends, said features configured to interlock when the valve body and the end cap are snap fit together, and wherein the interior stem comprises an injection molded plastic stem body having an enlarged top portion and an elongated lower portion, and a stainless steel insert pin disposed within the stem body and extending beyond the lower portion, forming a stepped structure whereby a lower surface of the lower portion of the stem body abuts a lower shoulder of the end cap, and only a portion of the stainless steel insert pin is exposed to the cage for actuation by an animal therein.

In some embodiments, the injection molded plastic forming the valve body, the end cap, and the stem body comprises polyphenylsulfone.

In some embodiments, said features comprise one or more protruding rings around a circumference of the valve body.

In some embodiments, said features comprise one or more openings around a circumference of the end cap.

In some embodiments, the valve assembly further comprises a replaceable micron-level water filter positioned within the valve body at a distal end of the fluid channel therethrough. In some embodiments, the filter has a three-dimensional shape. In some embodiments, the filter has a substantially cylindrical shape.

In some embodiments, the valve assembly further comprises a non-removable stainless steel valve shield covering the valve body and the end cap and held permanently in place on the valve body by a crimp in the metal.

In some embodiments, the valve shield comprises identifying information engraved or etched thereon.

In some embodiments, the valve assembly is configured to be mounted to the cage.

In some embodiments, the valve assembly further comprises a valve stem for mounting the valve assembly into an air grommet in a sidewall of the cage, wherein the valve stem comprises: a proximal end comprising screw threads for connecting to the valve assembly; a distal end comprising an elongated portion for connecting to a quick disconnect (QD) element; and a peripheral flange between the proximal end and the distal end forming an air baffle at the grommet to prevent non-sterile air from entering the cage when the cage is detached from the caging system, wherein the proximal end, the distal end, and the peripheral flange comprise a unitary body formed of injection molded plastic.

In some embodiments, the proximal end of the valve stem further comprises at least two injection molded plastic elements permanently molded thereto, including an alignment element molded at a distal end of the screw threads and a sealing element molded at the proximal end of the screw threads.

In some embodiments, the sealing element is molded into an undercut in the proximal end of the valve stem.

In some embodiments, the proximal end, the distal end, and the peripheral flange of the valve stem are formed in a first mold and moved to a second mold, and the alignment element and the sealing element are molded thereto in the second mold.

In some embodiments, the proximal end, the distal end, and the peripheral flange of the valve stem are formed via a first injection in a mold, and the alignment element and the sealing element are molded thereto via a second injection in the mold.

In some embodiments, the valve assembly is configured to be mounted to the automatic water system manifold.

In some embodiments, the valve assembly is configured to be mounted to the automatic water system manifold via a quick disconnect (QD) element.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the invention, will be better understood when read in conjunction with the appended drawings. For the purposes of illustrating the systems and methods of the present application, there are shown in the drawings preferred embodiments. It should be understood, however, that the application is not limited to the precise arrangements and instrumentalities shown. In the drawing figures, which are merely illustrative, and wherein like reference characters denote similar elements throughout the several views:

FIGS. 42A and 42B are cross-section views of the embodiment of a valve assembly shown in FIG. 41 in assembled form (A) before snap fit is engaged, without valve shield and (B) with valve body and end cap snap fit together;

FIGS. 59A and 59B are cross-section views of an embodiment of a valve assembly (A) before welding, and (B) with valve body and end cap sonic welded together.

DETAILED DESCRIPTION OF EXEMPLARY EMBODIMENTS

Figure 1:
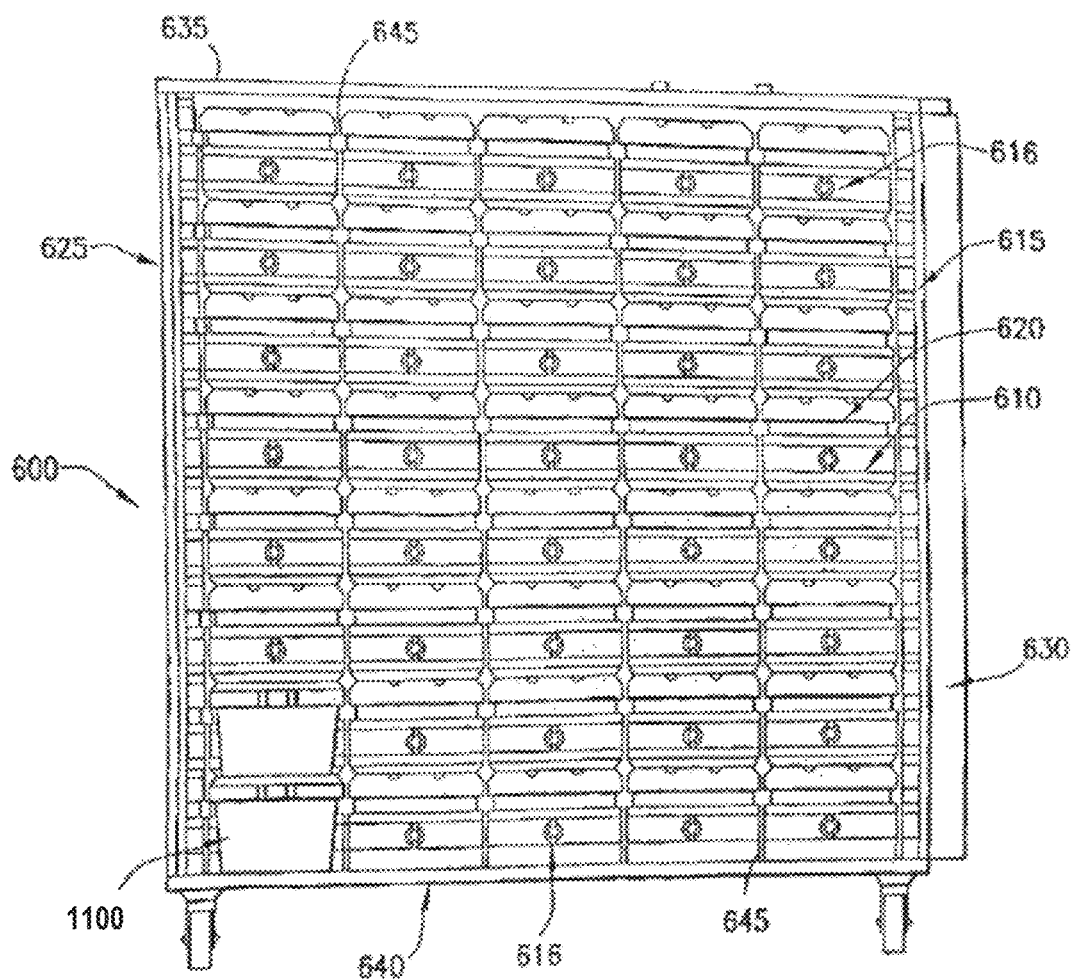
FIG. 1 is a plain side view of a double-sided rack system incorporating an animal cage.
Figure 38:
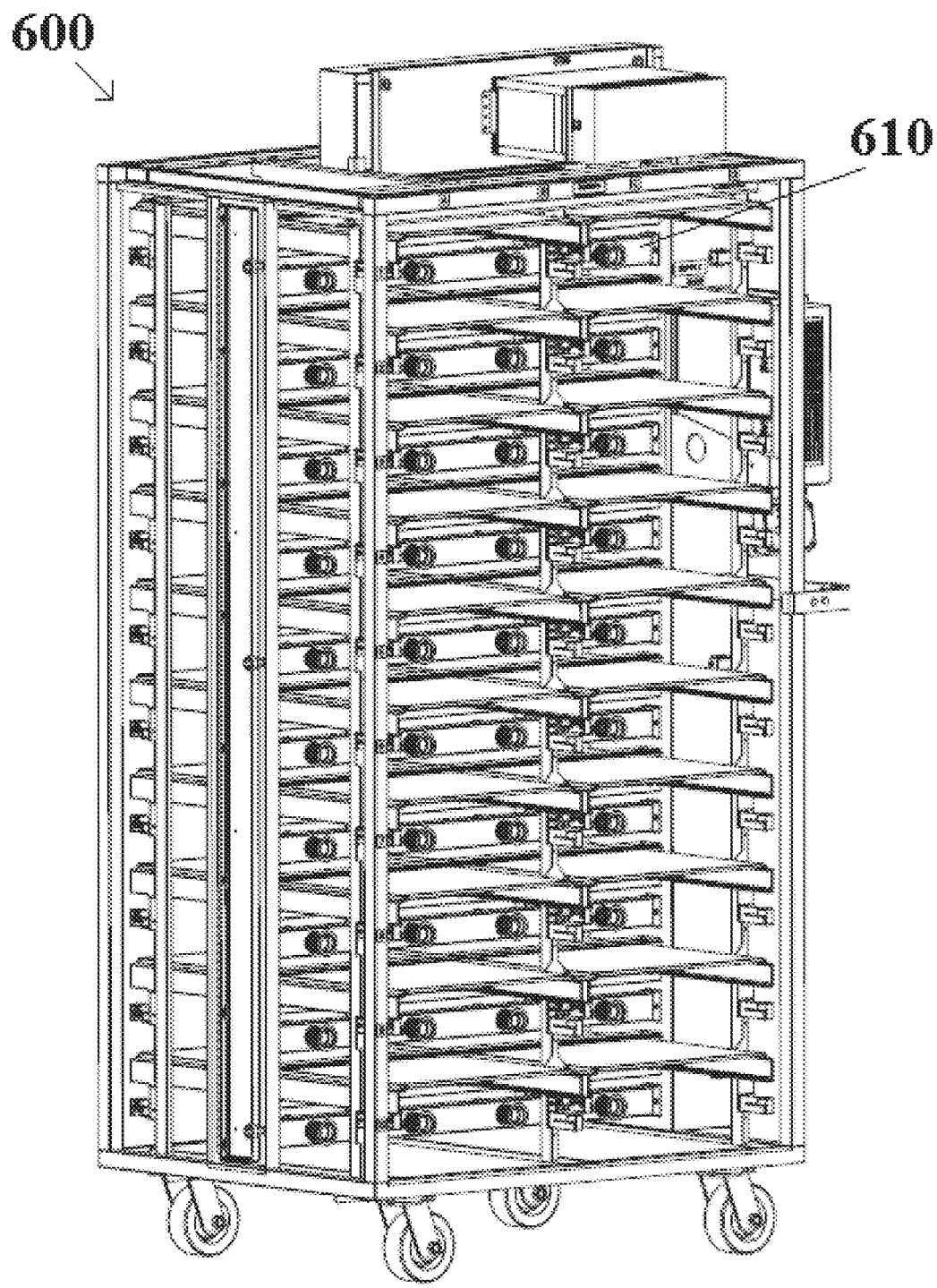
FIG. 38 is a perspective view of an embodiment of an animal housing rack equipped with air supply plena with docking assemblies.
Figure 39:
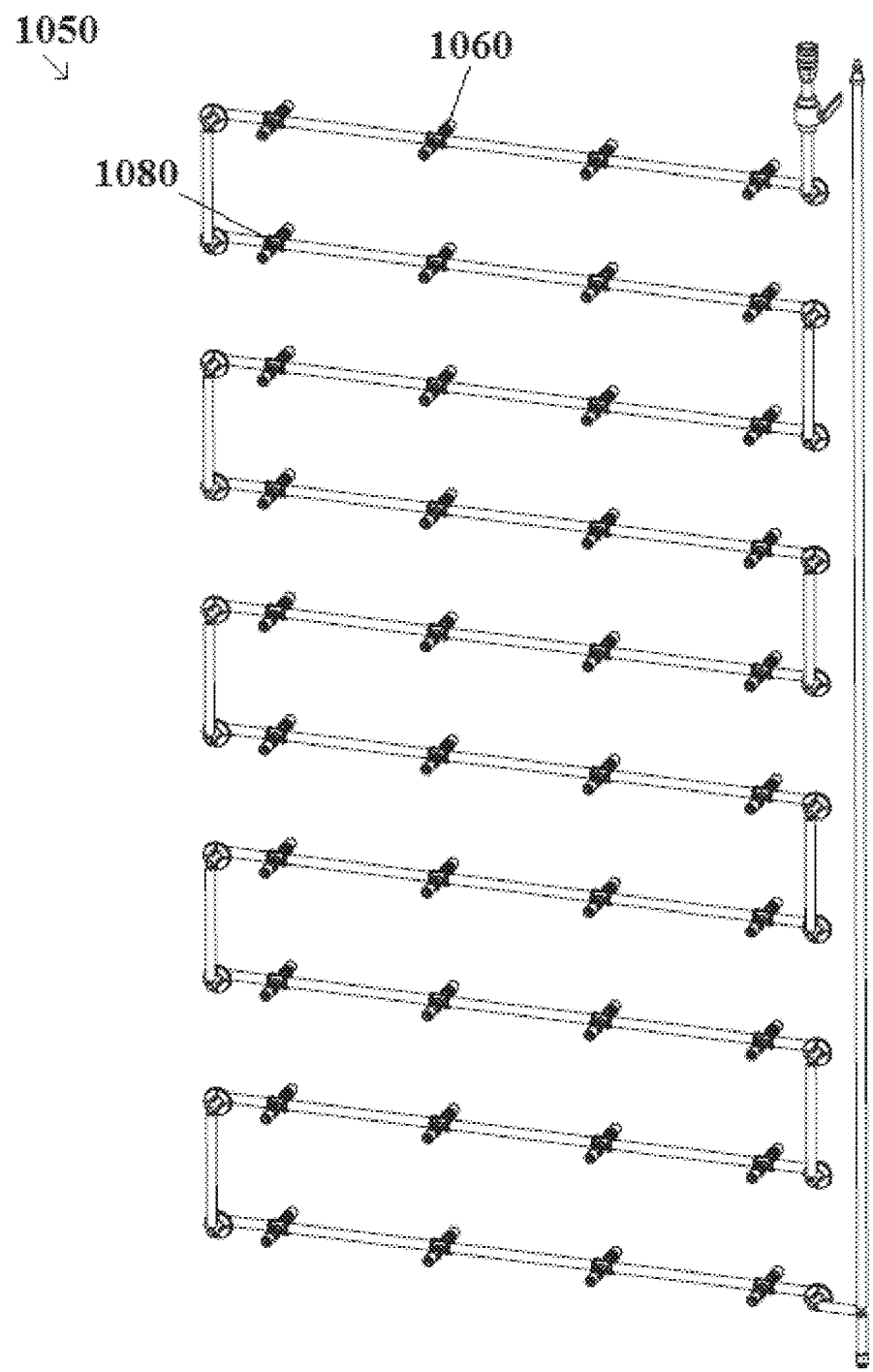
FIG. 39 is a perspective view of an embodiment of a water supply manifold with quick disconnect elements mounted thereon with saddle fittings.
Figure 40:
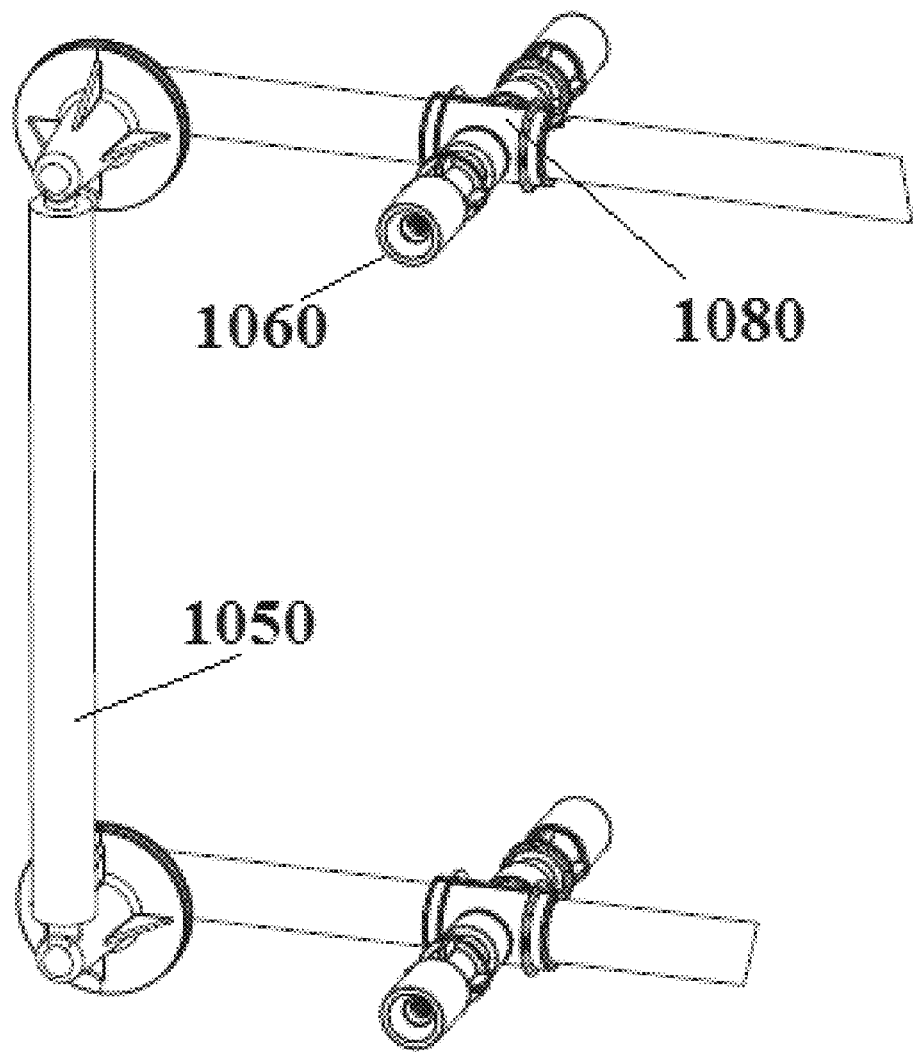
FIG. 40 is a detailed sectional view of the embodiment of the water supply manifold shown in FIG. 39.

Referring to FIGS. 1 and 38, an animal isolation and caging rack system 600 of the invention includes an open rack 615 having a left side wall 625 and a right side wall 630, a plurality of rack coupling stations 616, a top 635, and a bottom 640. A plurality of posts 645 are disposed in parallel between top 635 and bottom 640. Vertical posts 645 are preferably narrow and may comprise walls extending substantially from the front of rack 615 to the rear of rack 615, or may each comprise two vertical members, one at or near the front of rack 615 and the other at or near the rear of rack 615. In an exemplary embodiment, animal isolation and caging rack system 600 may also include one or more air supply plena 610 and air exhaust plena 620 alternately disposed in parallel between left side wall 625 and right side wall 630 in rack 615.

In an exemplary embodiment, an air supply blower (not shown) can provide HEPA filtered air through a supply plenum, preferably extending horizontally proximate the top of rack 600, to an air supply channel of air supply plenum 610. The air can be provided through an air supply docking assembly to a cage 1100 in rack 615.

As shown, for example, in FIGS. 34-37, in an exemplary embodiment, air supply plenum (air manifold) 610 preferably includes a plurality of air supply docking (air dock) assemblies 680 along its length, air supply docking assemblies 680 being in fluid communication with air supply channel 670 to provide air therefrom. For example, if a cage is connected to air supply docking assembly 680, air from air supply channel 670 can be provided through air supply docking assembly 680 into the cage. Air supply docking assemblies 680 can be pre-assembled on air supply plenum 610. More preferably, air supply docking assemblies 680 are inserted into corresponding docking apertures 680a in air supply plenum 610 until secure. Alternatively, a separate attaching mechanism can be provided. By way of non-limiting example, one or more screws, nails, bolts and washers, etc. can be used to secure air supply docking assemblies 680 to air supply plenum 610. In accordance with an exemplary embodiment, air supply docking assembly 680 creates a seal with air supply plenum 610 to prevent leakage of air from between air supply docking assembly 680 and air supply plenum 610.

With reference to FIGS. 2-3 and 36-40, in an exemplary embodiment, animal isolation and caging rack system 600 may also include one or more water supply manifolds 1050 that operate in connection with a valve assembly 1000 (as discussed in detail below) to deliver water to the animals housed in cages 1100 in cage and rack systems 600. In an exemplary embodiment, the water supply manifold 1050 may be disposed in the air supply channels 670 of the air supply plena 610 of the rack system 600.

Figure 34:
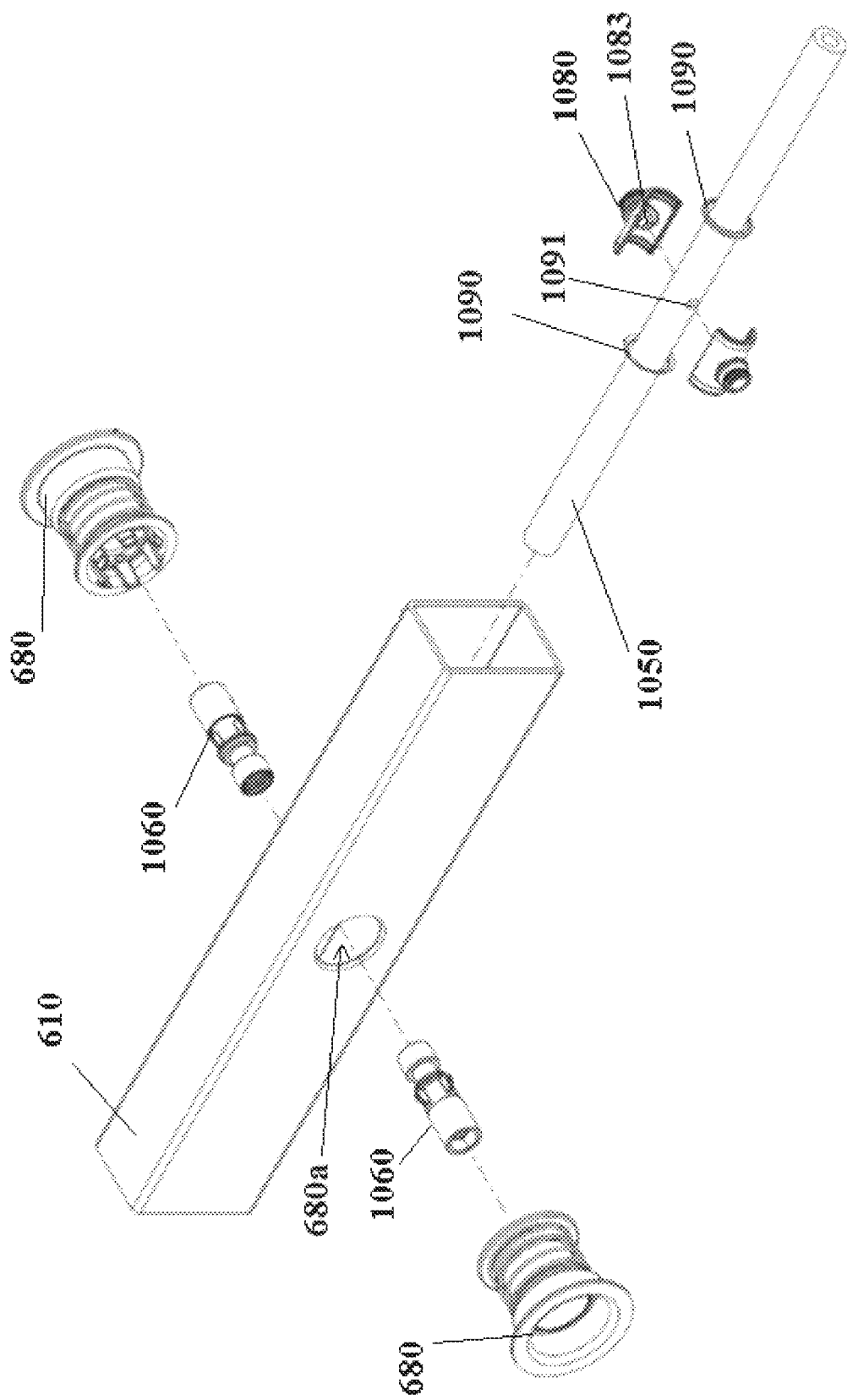
FIG. 34 is an exploded perspective view of an embodiment of an air supply plenum with a water supply manifold, saddle fittings, quick disconnect elements, and docking assemblies.
Figure 35:
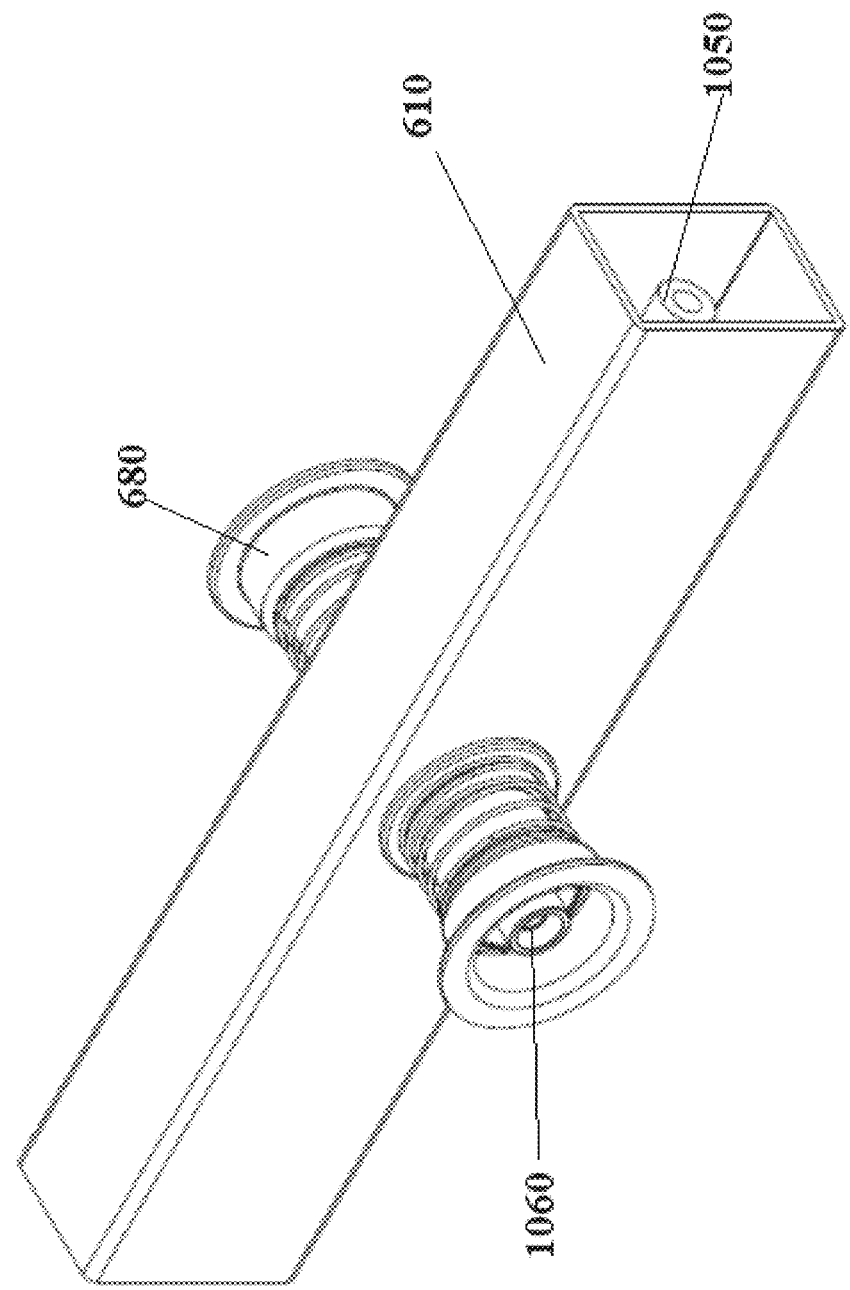
FIG. 35 is a perspective view of the embodiment of an air supply plenum shown in FIG. 34 in assembled form.
Figure 36:
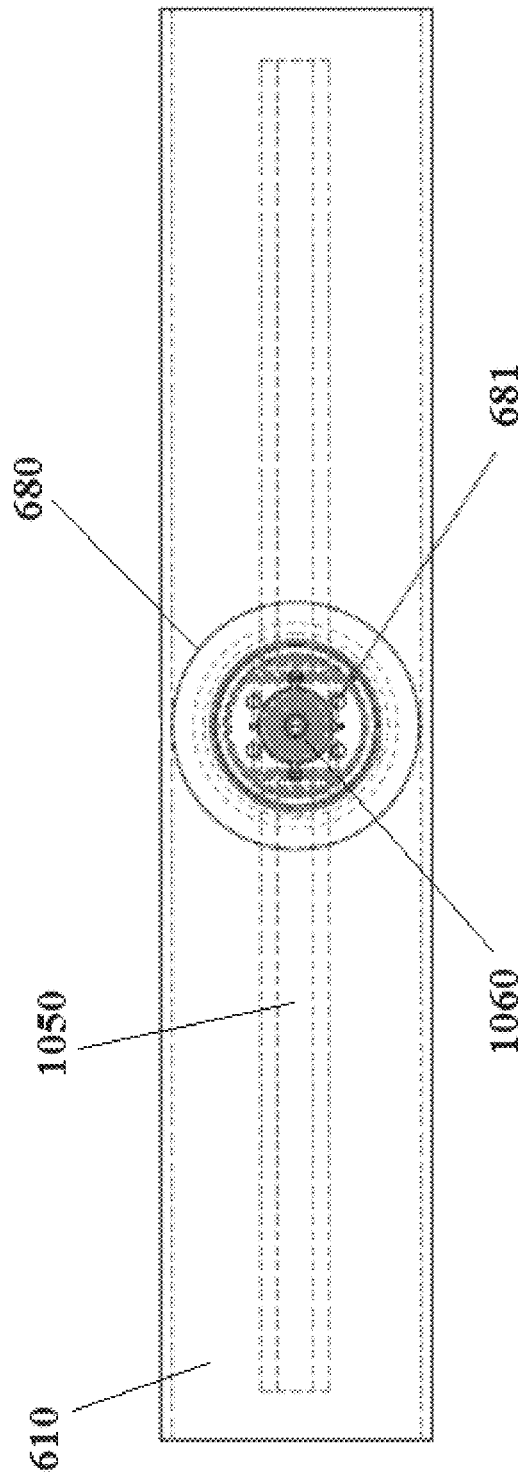
FIG. 36 is a front planar view of the embodiment of an air supply plenum shown in FIG. 35.
Figure 37:
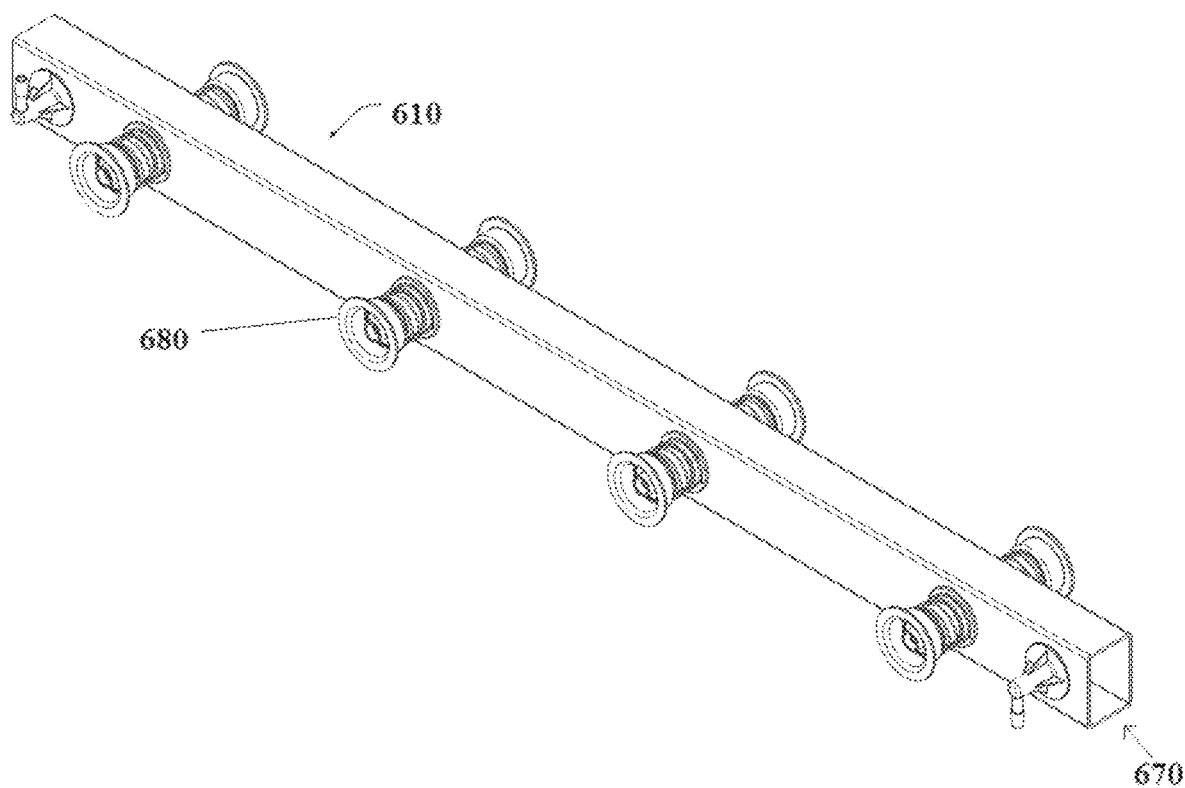
FIG. 37 is a perspective view of an embodiment of an air supply plenum with docking assemblies.

In an exemplary embodiment, the water supply manifold 1050 may comprise a silicone pipe (see FIG. 34). For example, in some embodiments of the invention, a water supply manifold 1050 is provided which comprises a flexible silicone rubber manifold tube having holes cut at predetermined locations along its length (e.g., at each air dock location). In other embodiments, different materials may be used, for example, a tube made of rubber or other rubber-like material such as a thermoplastic elastomer. An exemplary thermoplastic elastomer material is Santoprene™, which is a thermoplastic vulcanizate (TPV). However, it is understood that the water supply manifold 1050 may take the form of any suitable shape and/or be made of any suitable alternative material that is now known or later developed. In some embodiments, systems and methods of the present invention include fixtures and/or tooling to produce the manifold lines. For example, in some embodiments, a tool may be provided for rotary cutting holes in the silicone tube/pipe/hose without producing shavings or particles. The tooling and methodology of the present invention produces holes in the flexible tubing of the manifold horizontal lines and allows saddle fittings (two-piece saddle that clamps around the silicone manifold hose and can be held together with spring retainer rings, as described in further detail below) precisely located. The holes produced are precise and accurate in size and location and the tube penetrations are accomplished without fines or shavings.

Figure 2:
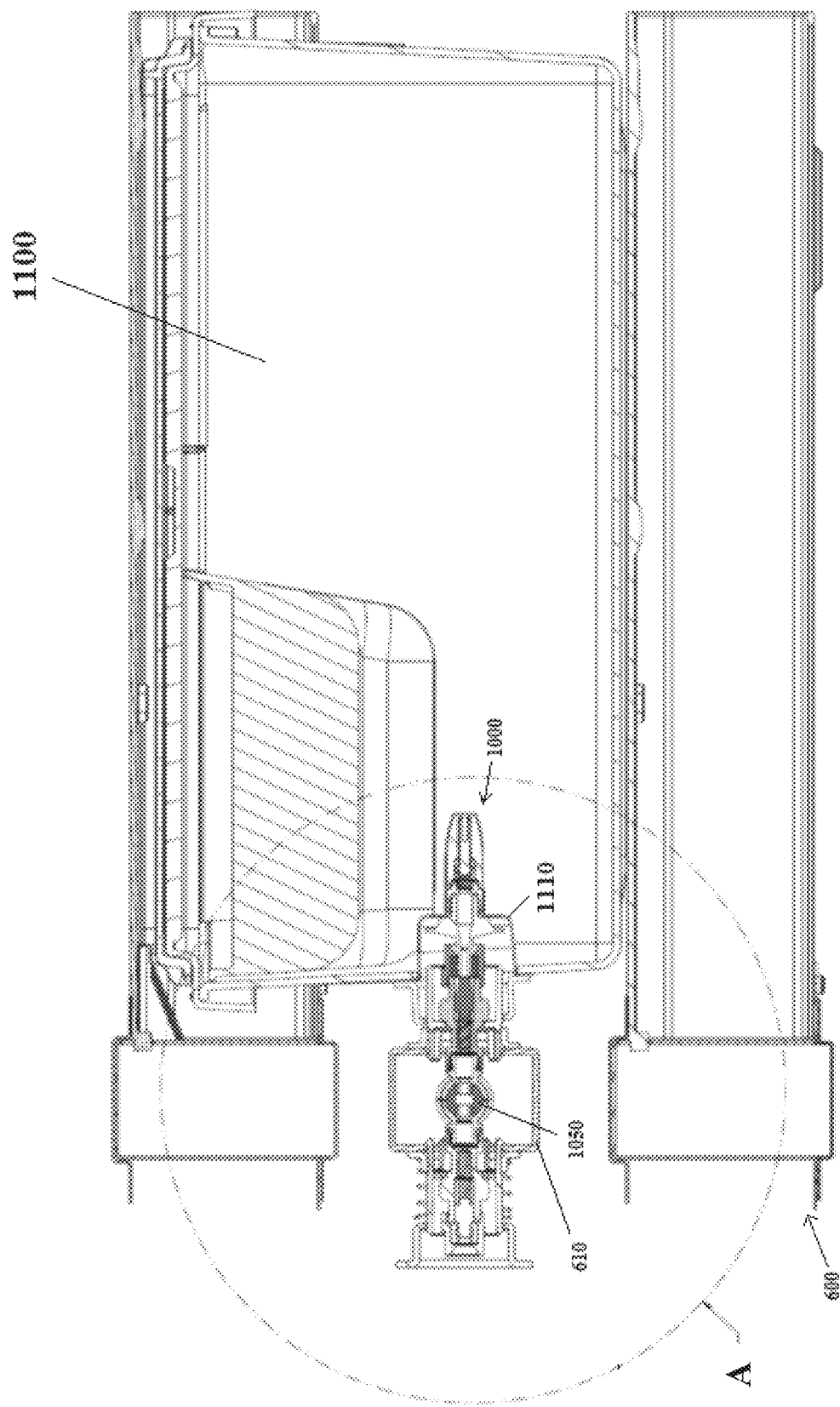
FIG. 2 is a side sectional view of an embodiment of a fluid delivery system mounted in an animal cage.
Figure 3:
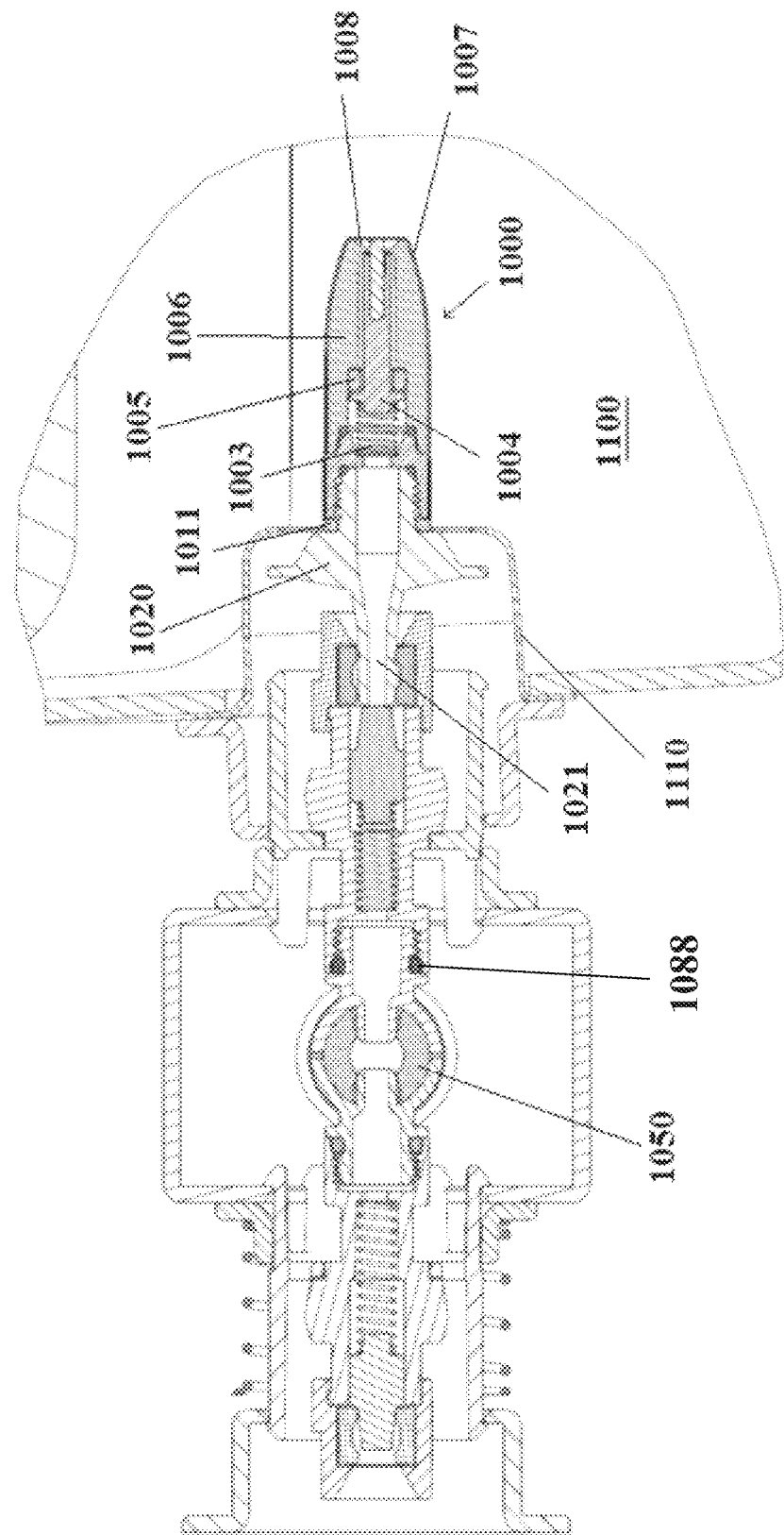
FIG. 3 is a detailed sectional view showing detail A of the embodiment of the fluid delivery system mounted in an animal cage shown in FIG. 2.

With reference to FIGS. 2-3 and 38, in an exemplary embodiment of the invention, a valve assembly 1000 can be implemented in a caging rack system 600 having one or more water supply manifolds 1050 to facilitate the delivery of water to animals housed in the caging rack system 600 using an automatic water system. Examples herein refer to rodent automatic watering systems primarily on ventilated housing units; however, in other embodiments, other types of cages for different species of animals (such as primate caging, rabbit caging, dog kennels, swine pens, rodent modular and See-Through™ Housing Systems, etc.) may be used. Preferably, the valve assembly 1000 is cage-mountable (as discussed below; e.g., drinking valve mounted to the inside of the cage through the air and water grommet) and designed and constructed to be compatible with existing animal housing systems. Preferably, the valve assembly 1000 can be used with existing ventilated units in the field, such as existing stainless steel manifolds for cage mounted valves/manifold (rack) mounted valves/manifold (rack) mounted quick disconnect valves, and/or with improved flexible hose-type manifolds and injection molded high performance plastic female quick disconnects as described in further detail below. In other embodiments, differently-molded valve attachments (e.g., valve tail component and valve extender) can be provided to fit the automatic water system valve assemblies of the present invention to manifolds from various manufacturers.

Existing automatic water systems, both manifolds and drinking valves, are predominantly made of High Grade T-316 stainless steel, which is a very expensive material. In addition, stainless steel is less than ideal because it can grow biofilm. The valves and many manifold parts are machined from solid T-316 stainless steel. For example, existing manifolds comprise welded stainless steel pipes/tubes and have mechanical compression type fittings. This raw material is very expensive and costly, labor-intensive manufacturing processes are required in order to produce the components of these systems. Such manufacturing processes normally consist of machining of complex components and welding. In addition, these rodent drinking valves are very complex designs made up of many components; they utilize silicone seals and diaphragms which break down and wear out over time, giving these expensive valves a useful service life of only about two to three years. Most facilities set up standard operating procedures so that the rodent drinking valves are pulled from service at an appropriate time in an attempt to avoid valve failure which could result in loss of animal life and or loss of study data. At most facilities the pulled valves are collected until a predetermined quantity of valves is reached and then they are sent back to the manufacturer for rebuilding. The manufacturers will rebuild the valves by cleaning them and replacing all of the silicone components for about one third of the original purchase price, which is still very expensive. The labor required to perform and manage such standard operating procedures, along with shipping and rebuilding costs, make the currently available automatic water systems expensive and labor intensive to maintain.

The present invention provides, in various embodiments, improved automatic water systems and automatic watering valves that can avoid the above-described disadvantages associated with existing automatic water systems (e.g., expensive stainless steel, welding, and machining processes, biofilm growth, etc.). For example, in some embodiments, the invention provides a manifold system in which the manifold lines comprise a tube/hose made of flexible silicone or similar material, instead of stainless steel pipe, and have holes/apertures at each air dock (saddle) location as described in further detail below. In preferred embodiments, instead of machined stainless steel fittings, injection molded high performance plastic fittings/connector components are provided. The wearable components of the automatic water system (e.g., the quick disconnect and the drinking valve) are thus designed and constructed for easy low cost replacement. According to various methods of the invention, either/both of these items can be changed out by simply unscrewing the worn component, discarding it, and then screwing the replacement component in place. The invention also provides, in various embodiments, a cage mounted long term use rodent drinking valve comprising components that are injection molded using high performance plastics. Injection molding of valve and connector components is a much faster process than machining from solid stainless steel material. Injection molding from engineered plastics can control tight tolerances and provide a long service life while still allowing for a price point at which, for example, a valve may be disposed of and replaced when needed instead of rebuilding, which is the case with most permanent stainless steel drinking valves. Fluid delivery systems and methods of the present invention can reduce the initial investment cost and can also reduce the ongoing maintenance labor and cost required over the life of the product with existing systems.

In preferred embodiments, the automatic fluid delivery systems and methods of the present invention provide both manifolds and valves in order to provide a rack down full solution for users. In some embodiments, the fluid delivery systems and methods of the present invention employ an extended service replaceable automatic water valve and/or a manifold system produced from alternative materials, construction techniques, and designs. Beyond the reduction in cost, fluid delivery systems and methods of the present invention can improve product reliability and can reduce maintenance labor by introducing a procedural change to facilities' standard operating procedures regarding rodent drinking valve maintenance. Users can remove the replaceable rodent drinking valves of the present invention from the animal cages at a predetermined time intervals and replace them with new valves. Since the cost of the present valves can be less than the cost of rebuilding permanent stainless steel valves and the shipping back and forth for rebuilding and labor to manage such task is eliminated, the user can save money. More importantly the systems and methods of the present invention provide the user with an easy means to change out the rodent drinking valves which is a simple procedure: unscrew/unfasten the existing valve and screw/fasten a new valve into the cage thus keeping the cage in service. Old valves can simply be discarded because of the low cost. Since the systems and methods of the present invention are so easy, users can execute the maintenance task on time rather than stretching it to the end of a study or waiting on a convenient time to take the cage out of service while the valve is being rebuilt, which tends to happen with the existing stainless steel permanent valves. Since the systems and methods of the present invention utilize fewer parts and the maintenance tasks are likely to be performed on time, the reliability of the systems and methods of the present invention can exceed that of existing systems and methods which use predominantly stainless steel parts, thus reducing failures/cage floods, loss of studies, loss of animal life, etc.

In an exemplary embodiment, with reference to FIGS. 2-19, valve assembly 1000 includes a valve body 1001, sealing elements 1002, 1005 (such as an O-ring), a spring element 1003, an interior stem 1004 (actuator), and an end cap 1006 having an interior shoulder 1017 and a jam-preventing opening 1008 to prevent animal bedding from jamming the valve assembly 1000. Preferably, plastic parts (body, stem, and end cap) are injection molded plastic; seals are silicone or similar material; and the spring is stainless steel, with features that prevent the tangling and intertwining of multiple springs. Internal components 1002-1005 can drop into end cap 1006 and then valve body 1001 is joined thereto to retain them. A stainless steel end cap (chew shield) 1007, which can prevent rodents from chewing the plastic valve, slides over the valve assembly and can be staked in place as described below.

In an exemplary embodiment, with reference to FIGS. 2 and 8, the valve body 1001 and end cap 1006 each define portions of a fluid channel 1010 through which fluid flowing from water supply manifolds 1050 may enter and flow through the valve assembly 1000 when the valve assembly 1000 is in the open position (as further discussed below).

In an exemplary embodiment, the valve body 1001 includes a lower surface 1012 and a lower peripheral flange 1014 disposed in the fluid channel 1010. Valve body 1001 may also include screw threads 2022 for attaching to valve stem 1020 as described further below.

Figure 4:
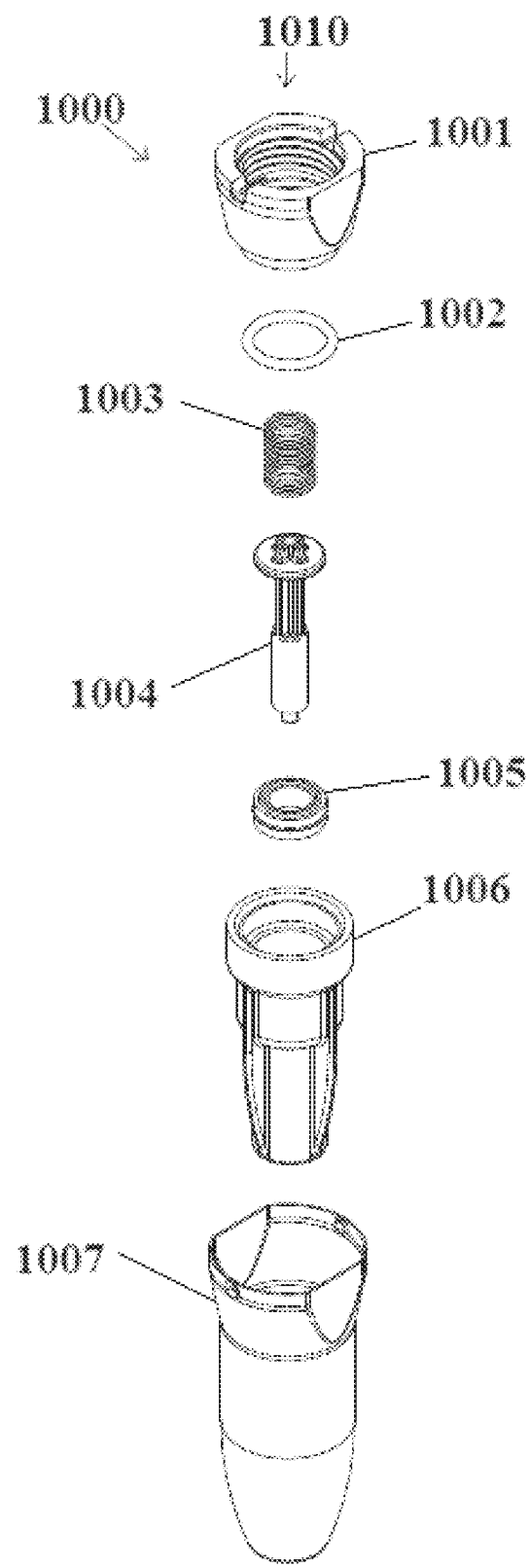
FIG. 4 is an exploded perspective view of an embodiment of a valve assembly.
Figure 5:
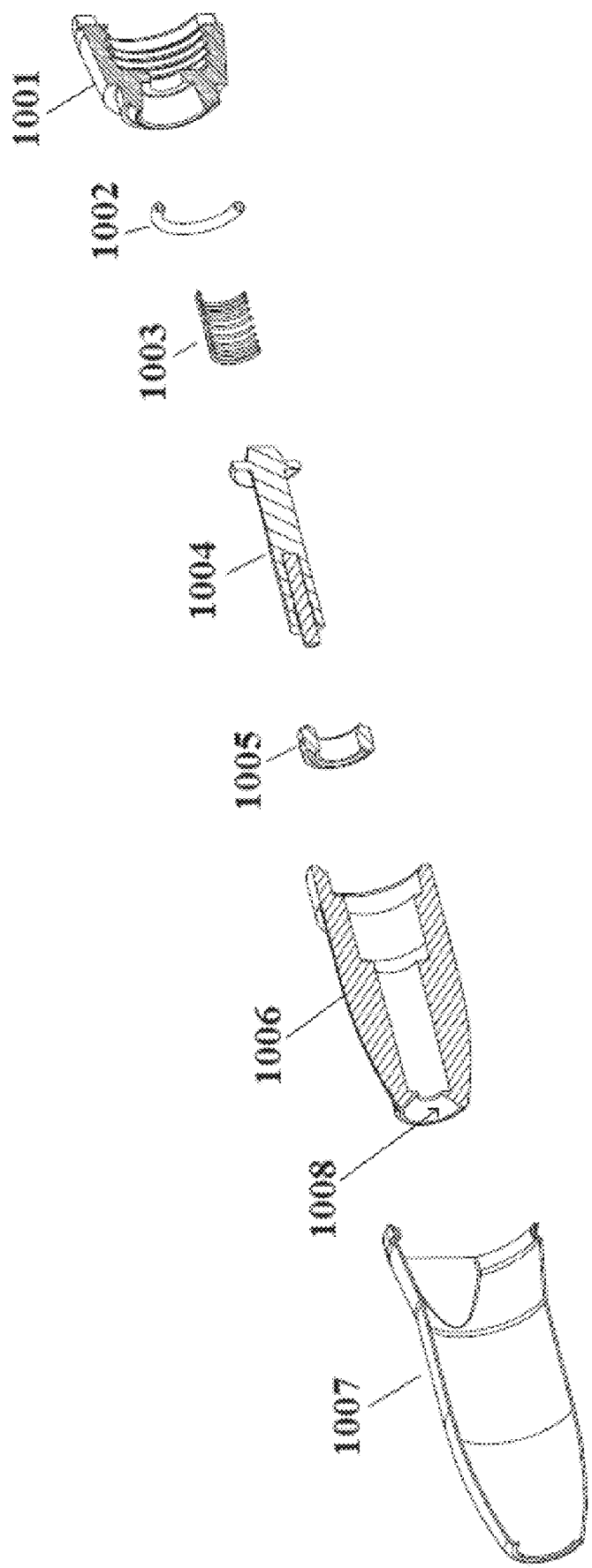
FIG. 5 is an exploded cross-section view of an embodiment of a valve assembly.
Figure 6:
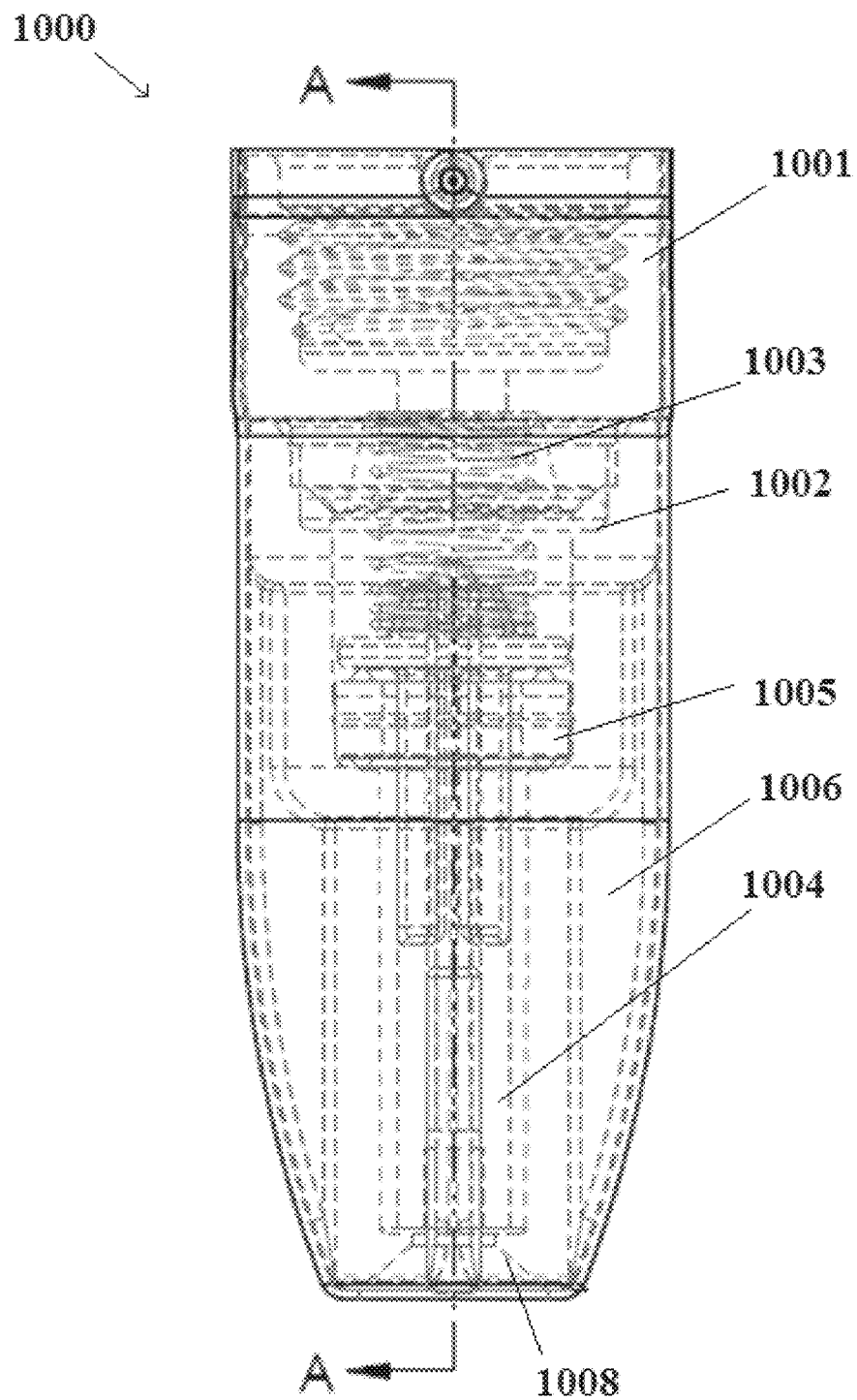
FIG. 6 is a top view of an embodiment of a valve assembly.
Figure 7:
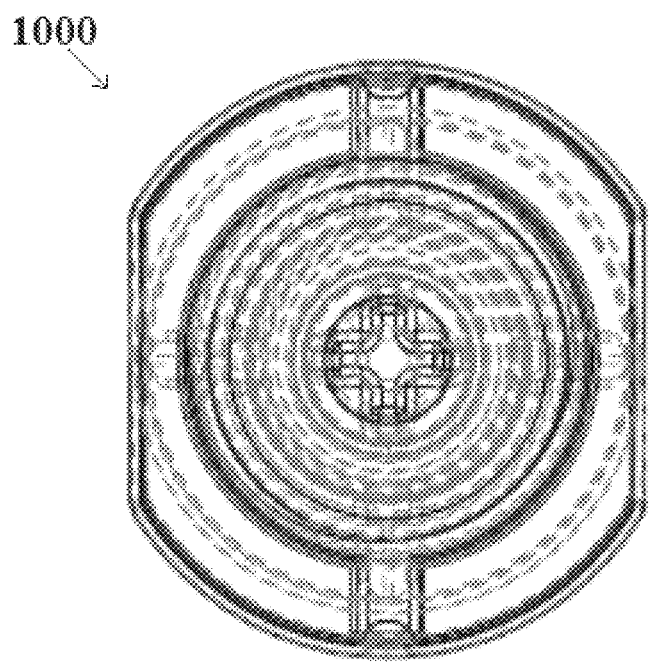
FIG. 7 is rear view of an embodiment of a valve assembly.
Figure 11:
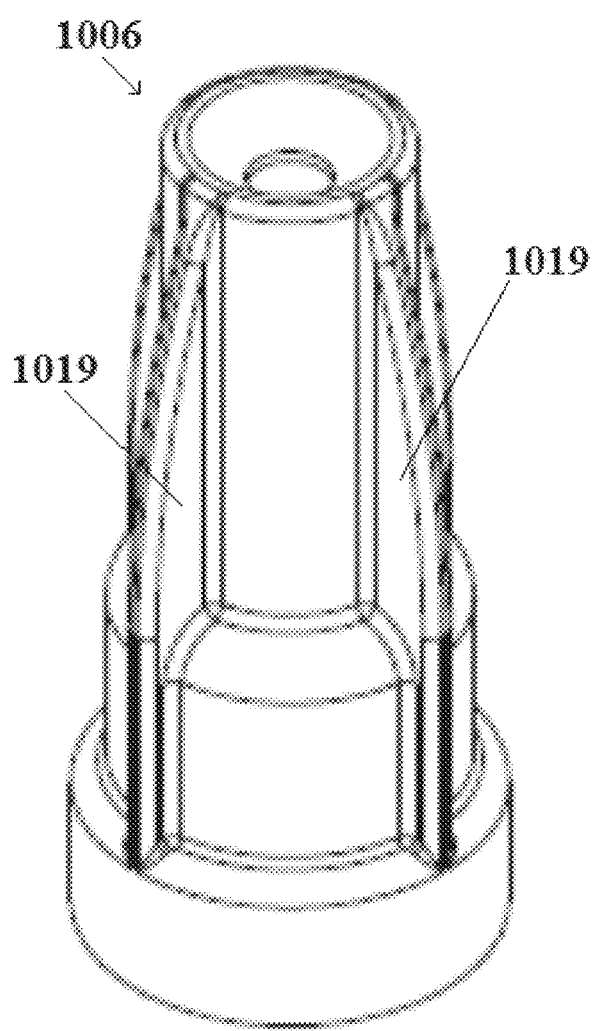
FIG. 11 is a perspective view of an embodiment of an end cap of a valve assembly.
Figure 12:
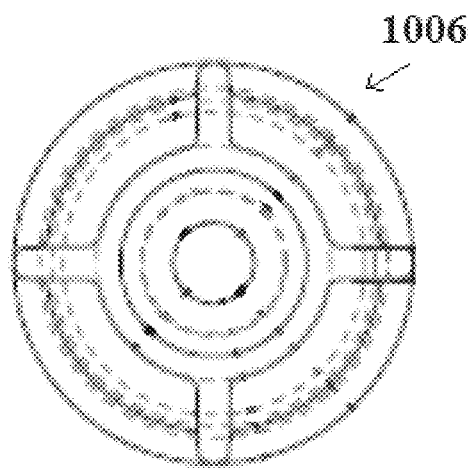
FIG. 12 is a front view of an embodiment of an end cap of a valve assembly.
Figure 13:
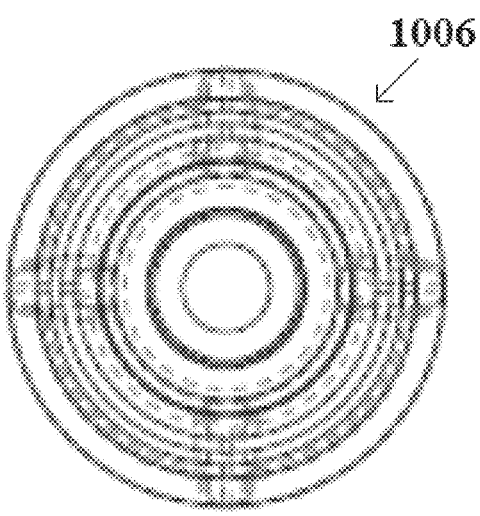
FIG. 13 is a rear view of an embodiment of an end cap of a valve assembly.
Figure 14:
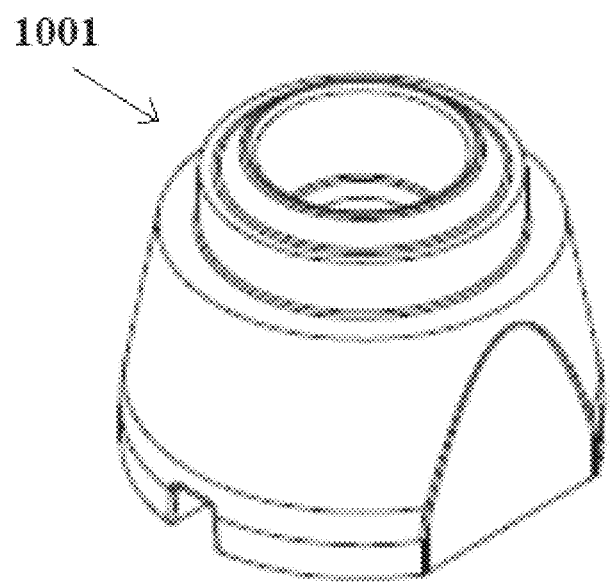
FIG. 14 is a perspective view of an embodiment of a valve body of a valve assembly.
Figure 15:
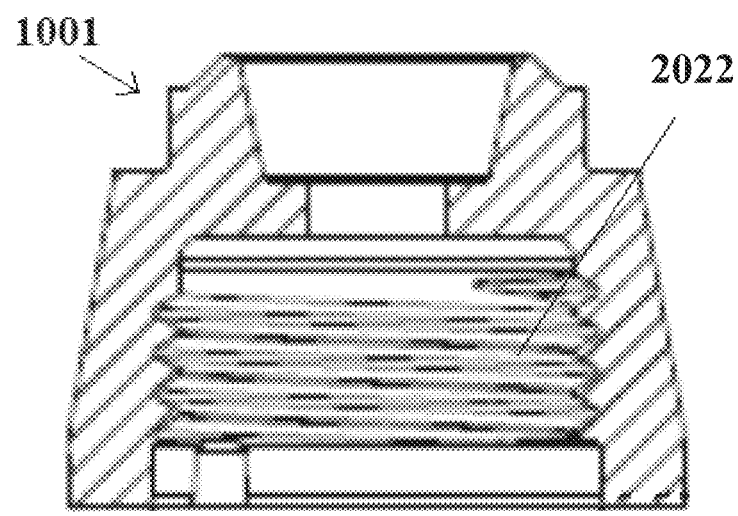
FIG. 15 is a cross-section view of an embodiment of a valve body of a valve assembly.
Figure 16:
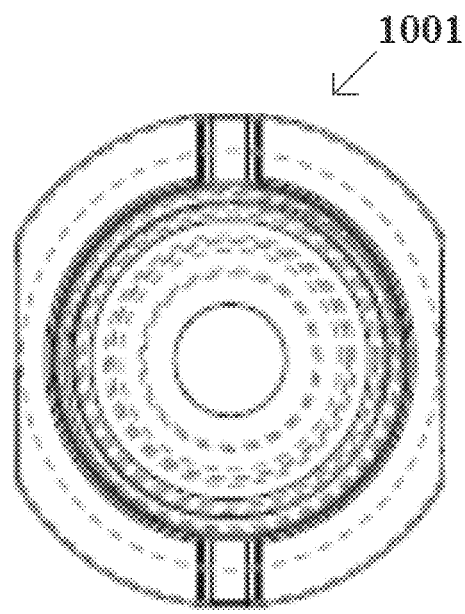
FIG. 16 is a rear view of an embodiment of a valve body of a valve assembly.
Figure 20:
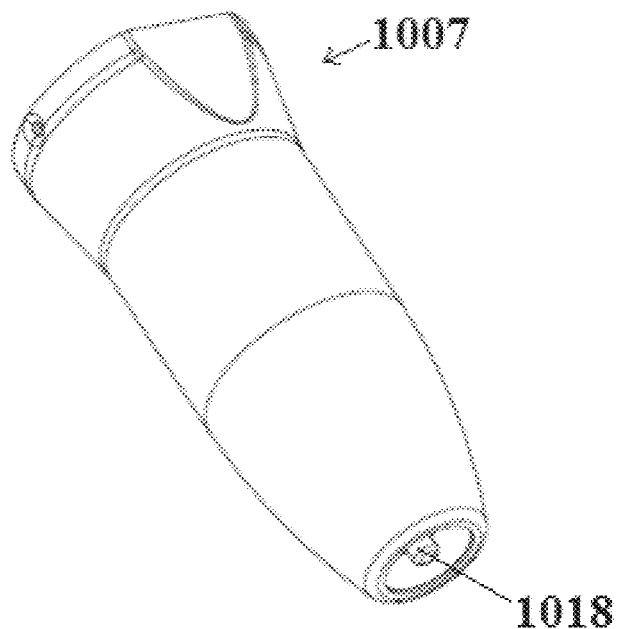
FIG. 20 is a perspective view of an embodiment of a valve shield covering a valve assembly.
Figure 21:
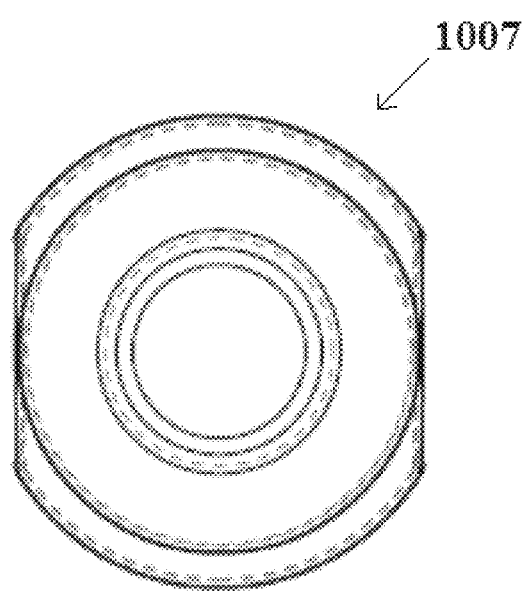
FIG. 21 is a front view of an embodiment of a valve shield of a valve assembly.
Figure 22:
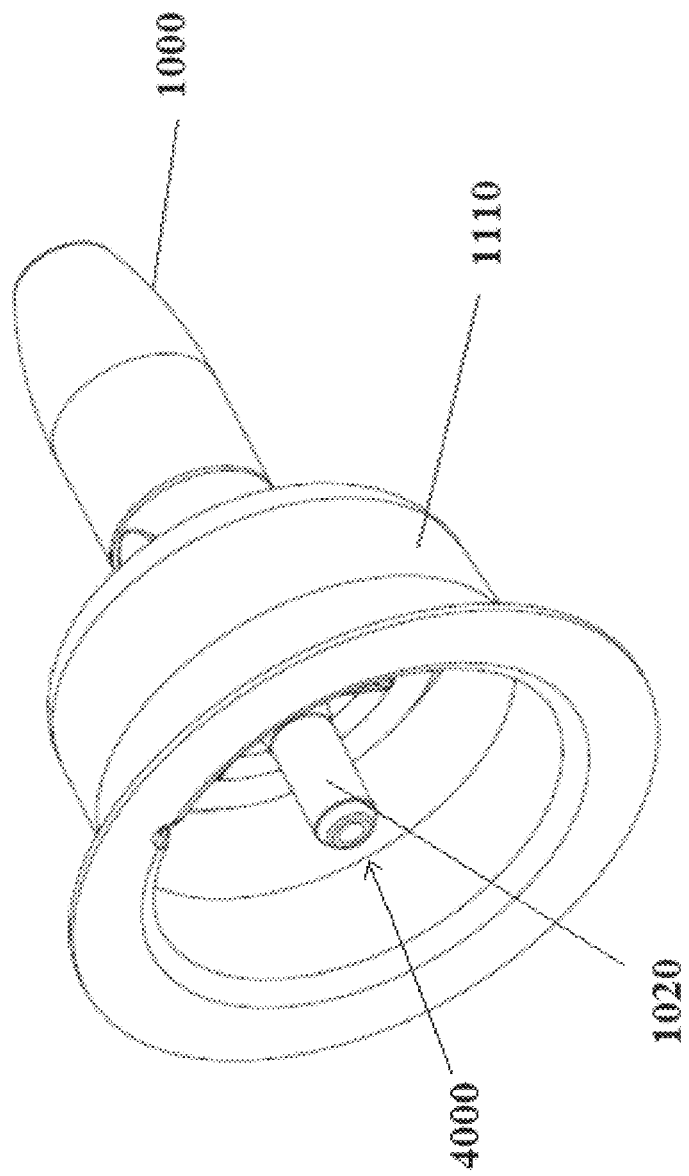
FIG. 22 is a perspective view of an embodiment of a valve assembly mounted in a grommet with a valve stem.

In an exemplary embodiment, the end cap 1006 is designed and dimensioned like a feeding nozzle to facilitate the delivery of water to animals and includes an interior shoulder 1017. In one embodiment, as shown in FIGS. 4 and 11, the end cap 1006 has ribs 1019 to facilitate dimensional stability where the end cap 1006 is injection molded by preventing thick sections of plastic from forming during injection molding. Otherwise, a buildup of thick sections of plastic would cause sink marks as the injection molded end cap 1006 cools, which would result in less dimensional stability. In another embodiment, as shown in FIG. 5, the end cap 1006 is conical nose cone shaped. The end cap 1006 preferably has a tapered end to facilitate installation of the metal shield 1007 (see FIG. 20).

Figure 8:
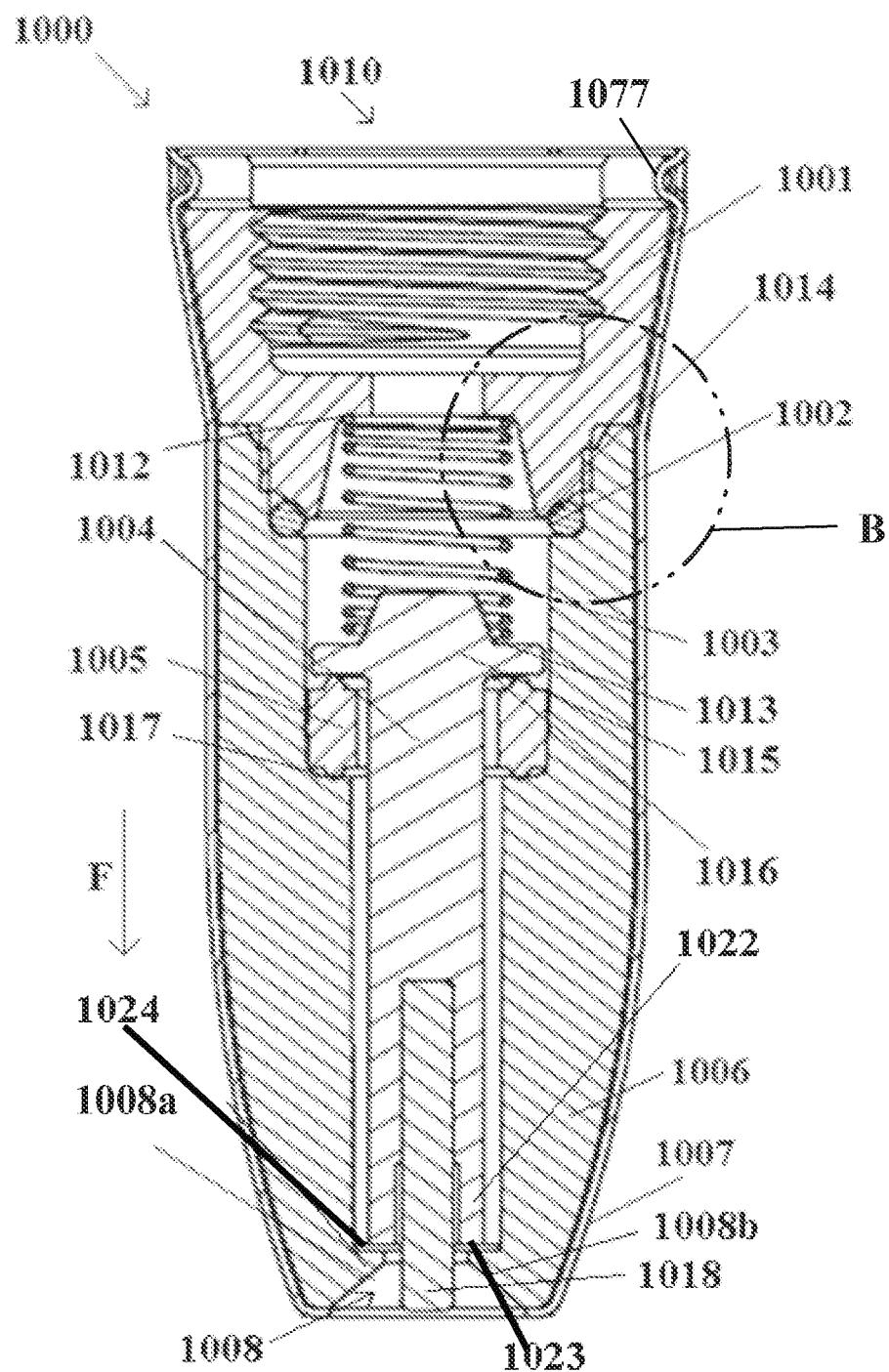
FIG. 8 is a cross-section view of the embodiment of a valve assembly shown in FIG. 6 along line A-A, when the valve assembly is in the closed position.
Figure 9:
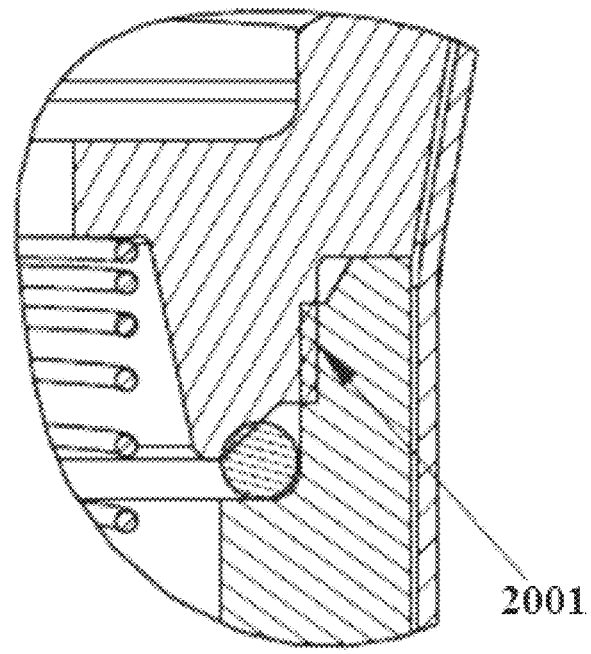
FIG. 9 is a detailed sectional view showing detail B of the embodiment of a valve assembly shown in FIG. 8.
Figure 10:
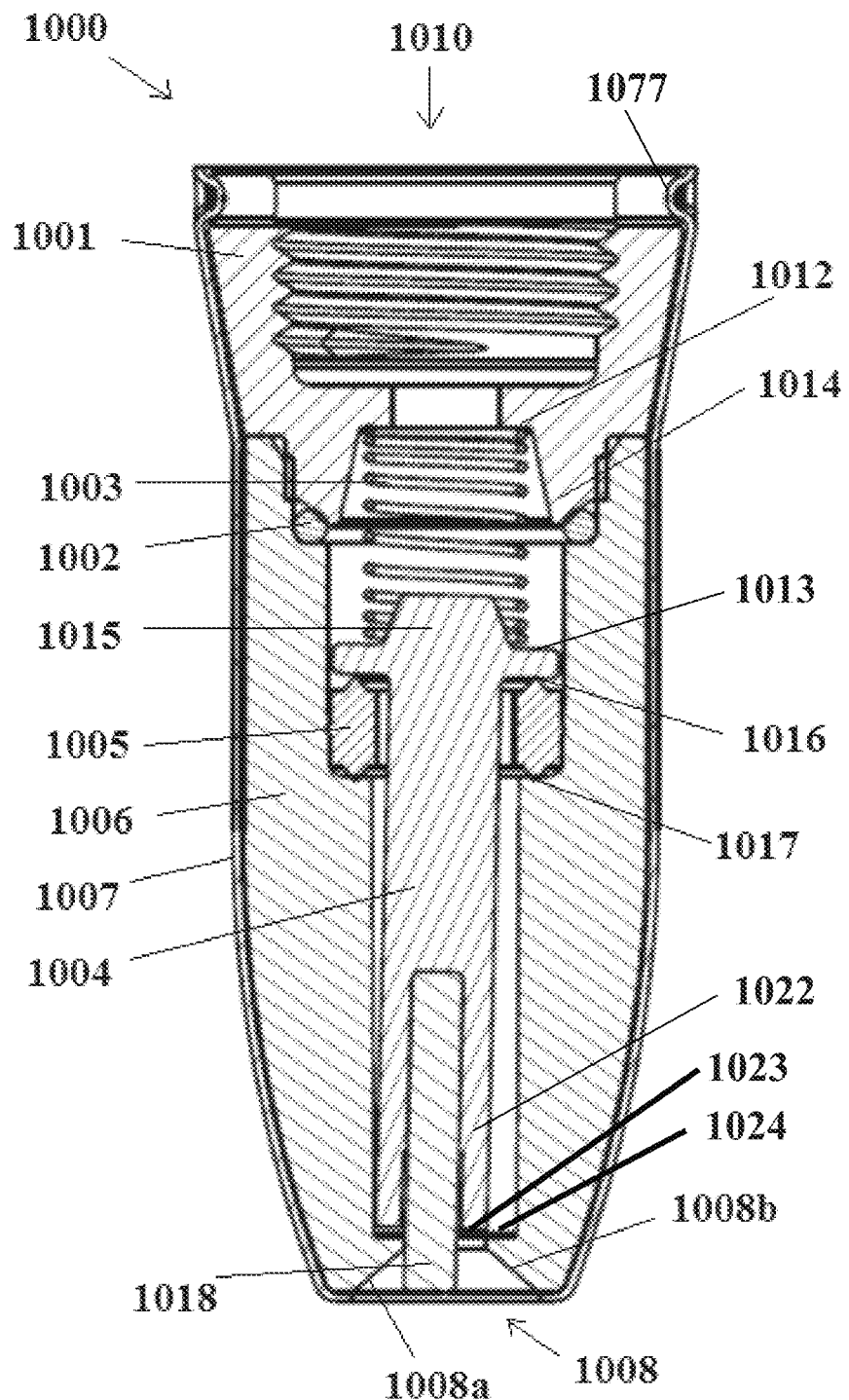
FIG. 10 is a cross-section view of the embodiment of a valve assembly shown in FIG. 6 along line A-A, when the valve assembly is in the open position.

In an exemplary embodiment, with reference to FIGS. 8-10, the valve body 1001 is joined to the end cap 1006. The valve body 1001 and end cap 1006 may be joined via sonic welding or by similar means known to those of ordinary skill in the art, producing a hermetic seal after welding. When sonic welding is used to join the valve body 1001 and end cap 1006, a self-aligning joint, such as shear joint 2001, as shown in FIG. 9, may be provided in the components.

In some cases, the sonic weld process may create debris (e.g., shredded plastic shavings, particulate plastic, etc.) that could get into the valve and onto the rubber O-rings 1002 and/or 1005 causing leaks. For example, small plastic particles from the sonic welding could interfere with the sealing of the valve stem 1004 on sealing element/O-ring 1005. To reduce/eliminate the debris from sonic welding, in some embodiments, as shown in FIG. 59B, valve body 1001 may be modified to include an elongated collar portion/extension 1111 protruding into end cap 1006, creating an enclosed area/chamber to block debris from migrating to the area of O-ring 1005. Air pocket 2002 can catch some of the debris from the sonic weld. Elongated collar 1111 extends into end cap 1006 to seal air pocket 2002 and prevent debris from getting into the proximal portion of the valve. FIGS. 59A and 59B are cross-section views of an embodiment of a valve assembly (A) before welding, and (B) with valve body and end cap sonic welded together.

In still further embodiments, with reference to FIGS. 41-43 and 53-56, to further reduce/eliminate the debris found on the O-ring 1005 from sonic welding, valve body 1001 and end cap 1006 may be joined via snap fit, which produces virtually no debris. For these snap-fit embodiments, injection molds for valve body 1001 and/or end cap 1006 are preferably modified to include interlocking features 1048, 1049 that can lock when the two pieces are pressed together with force. For example, in some snap-fit embodiments, valve body 1001 is configured with at least one protruding feature 1048 dimensioned to allow end cap 1006 to lock in place when these parts are pressed together. End cap 1006 has, correspondingly, at least one feature 1049 around an external ring and configured to interface with the protruding feature 1048 of the valve body 1001 and allow the two parts to lock together in any radial orientation. In other embodiments, different types of interlocking features may be used to facilitate the snap fit. An O-ring or other sealing element 1002 may be provided, which creates a seal between the two parts when they are snapped together. In certain preferred embodiments, valve body 1001 includes one or more snap fit features such as protruding rings 1048 (see FIGS. 53-54). End cap 1006 includes one or more snap fit features such as openings/fenestrations 1049 (see FIGS. 55-56), which each create an interior ledge for capturing protrusions 1048. FIGS. 42A and 42B are cross-section views of the valve assembly of FIG. 41 with filter 1030 (described below) inserted into valve body 1001 and O-ring 1002 in between valve body 1001 and end cap 1006 proximate the snap joint 1040. FIG. 42A shows the valve assembly before snap fit is engaged (valve shield not shown), and FIG. 42B shows the valve assembly with snap fit engaged. Before snap fit is engaged, snap feature/protrusion 1048 on valve body 1001 is above snap feature/opening 1049 on end cap 1006. After valve body 1001 and end cap 1006 are snap fit together, snap feature/protrusion 1048 on valve body 1001 is at least partly fitted into and retained by snap feature/opening 1049 on end cap 1006 at snap joint 1040.

In an exemplary embodiment, as shown in FIGS. 4-5, 8, and 10, sealing elements 1002, 1005, spring element 1003, and interior stem 1004 having a top portion 1015 with a top surface 1013 and bottom surface 1016 are disposed between and within the valve body 1001 and end cap 1006 (and in the fluid channel 1010) to open and/or close the valve assembly 1000. In an exemplary embodiment, the top portion 1015 of the interior stem 1004 is preferably enlarged (e.g., substantially nail shaped) such that the circumference of the widest part of the top portion 1015 is greater than the circumference of the remainder of the interior stem 1004.

Figure 17:
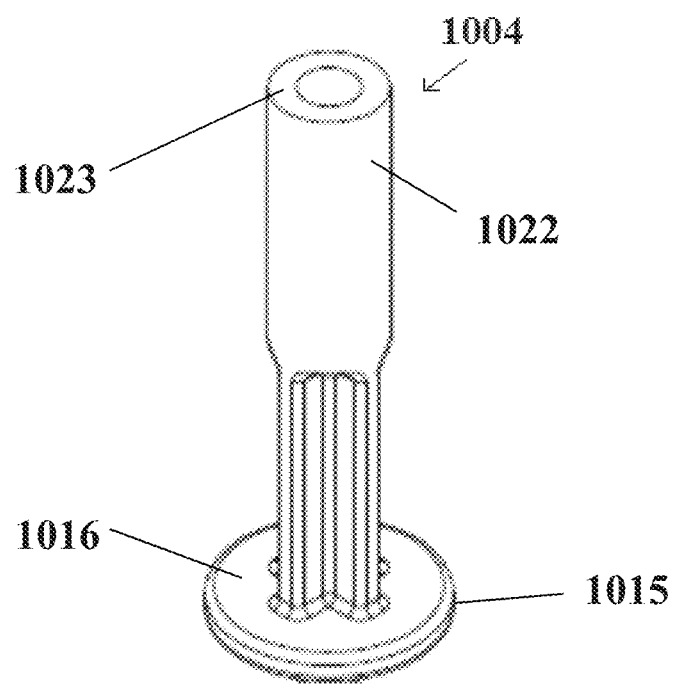
FIG. 17 is a perspective view of an embodiment of an interior stem of a valve assembly, without insert pin.
Figure 18:
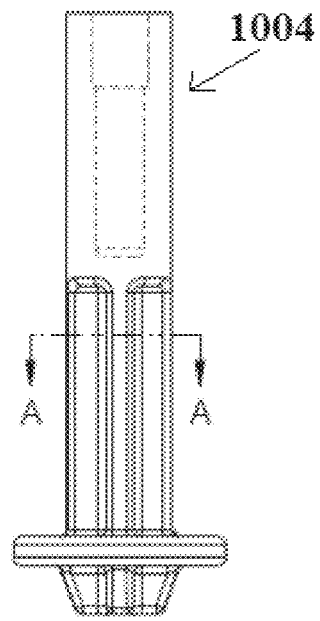
FIG. 18 is a plain side view of an embodiment of an interior stem of a valve assembly, without insert pin.
Figure 19:
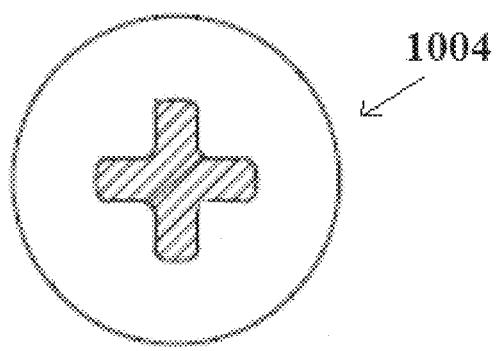
FIG. 19 is a cross-section view of the embodiment of the interior stem of a valve assembly shown in FIG. 18 along line A-A.
Figure 57:
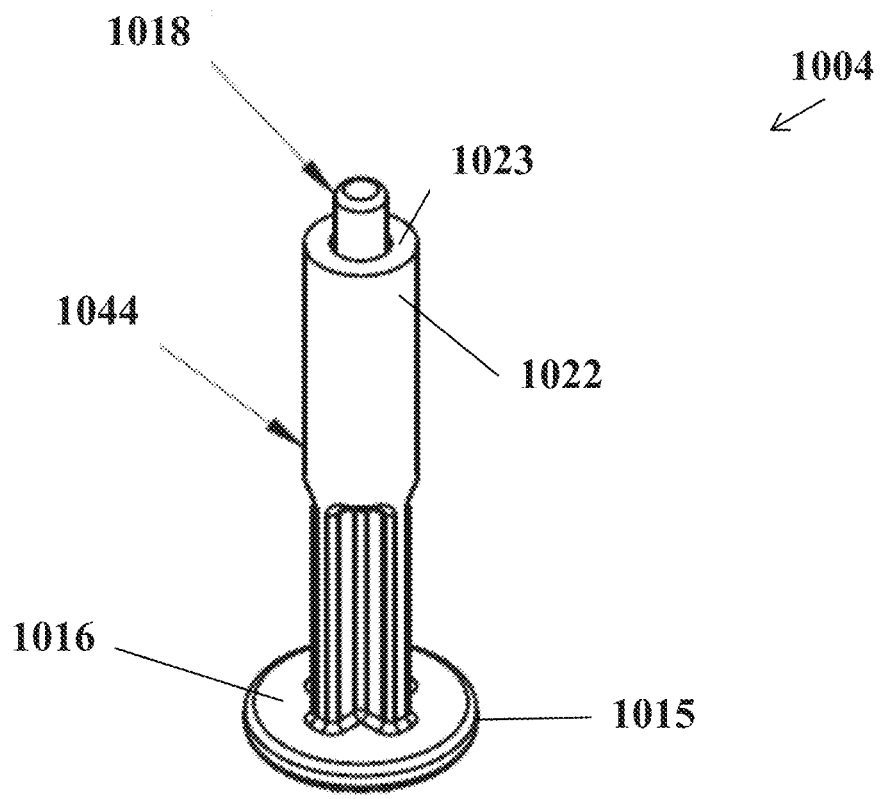
FIG. 57 is a perspective view of an embodiment of an interior stem of a valve assembly with insert pin.

In an exemplary embodiment, with reference to FIG. 8, when the valve assembly 1000 is in the closed position, one end of the spring element 1003 abuts the lower surface 1012 of the valve body 1001. The other end of the spring element 1003 abuts the top surface 1013 of the top portion 1015 of the interior stem 1004. Sealing element 1002 may be provided under the lower peripheral flange 1014 of the valve body 1001, within the end cap 1006, proximate the junction between the end cap 1006 and valve body 1001 to ensure that no leakage occurs. Another sealing element 1005 may be provided under the top portion 1015 of the interior stem 1004 to ensure that no leakage occurs when the valve assembly 1000 is in the closed position. The spring element 1003 provides an outwardly biasing force, toward the jam-preventing opening 1008 of the valve assembly 1000 (in direction F), which causes the bottom surface 1016 of the top portion 1015 of the interior stem 1004 to abut against the sealing element 1005, which abuts against the interior shoulder 1017 of end cap 1006. In preferred embodiments, interior stem 1004 comprises an injection molded plastic stem body, to reduce weight, increase component accuracy, reduce cost, etc. FIGS. 17-19 show the injection molded plastic stem body portion of interior stem 1004. To prevent the animals from chewing the end, a stainless steel pin insert (e.g., a knurled pin, not shown in FIGS. 17-19) is utilized on the portion that the animal has access to/activates (exposed portion 1018), said insert pin having a circumference smaller than that of the elongated stem. FIG. 57 shows stainless steel pin 1018 inserted into and emerging from the injection molded plastic stem body 1044 of interior stem 1004. Interior stem 1004 is thus stepped/tiered at the proximal end to create an indirect path for the water flow (described further below), keeping any small pieces of bedding chips out of the water valve, which could hold the valve open and cause cage flooding. Accordingly, the actuator/interior stem 1004 functions as a shield to prevent bedding and other debris from entering the valve. Exposed portion 1018 of the interior stem 1004 is disposed in the jam-preventing opening 1008 of the end cap 1006 and is externally accessible through the jam-preventing opening 1008. The exposed portion 1018 may be made, without limitation, of metallic or plastic type materials (now known or later developed). In this closed position, the fluid channel 1010 in the end cap 1006 is closed and no water is able to flow out of the jam-preventing opening 1008 of the valve assembly 1000.

The outwardly biasing force provided by the spring element 1003 has the benefit of allowing for high pressure flushing of the cage and rack system 600. This is beneficial because the water pressure keeps the valve assembly 1000 sealed and a higher water pressure can increase the strength of the seal in valve assembly 1000.

An exemplary embodiment of the valve assembly 1000 in the open position is shown in FIG. 10. To open the valve assembly 1000, for example, when an animal desires water, the animal may toggle the exposed portion 1018 of the interior stem 1004, which causes the interior stem 1004 to move toward the valve body 1001. This also causes at least a part of the top portion 1015 of the interior stem 1004 to move toward the valve body 1001, away from the sealing element 1005, which opens the fluid channel 1010, allowing fluid to flow through the fluid channel 1010 and out of the jam-preventing opening 1008 of the valve assembly 1000 to the animal.

In an exemplary embodiment, with reference to FIGS. 8 and 10, the jam-preventing opening 1008 is designed and constructed to prevent the valve assembly 1000 from jamming due to environmental factors, such as animal bedding entering the valve assembly 1000. For example, the interior stem 1004 may include a lower portion 1022 having a lower surface 1023 (see FIGS. 8, 10, 17, and 57) disposed in the fluid channel 1010. The lower surface 1023 of the lower portion 1022 of the interior stem 1004 abuts a lower shoulder 1024 of end cap 1006 (see FIGS. 8, 10, and 56), which is disposed proximate the jam-preventing opening 1008 within the end cap 1006. In this configuration, no direct path is provided into the valve and only a narrow and tortuous pathway into valve assembly 1000 is created by the lower surface 1023 of the lower portion 1022 of the interior stem 1004, even when the valve assembly 1000 is open (FIG. 10).

In an exemplary embodiment, jam-preventing opening 1008 preferably includes angular surfaces 1008a, 1008b, which taper inward from the jam-preventing opening 1008 towards the exposed portion 1018 of the interior stem 1004 to facilitate animal access to the exposed portion 1018 of the interior stem 1004, for example by providing a relief for a rodent's nose.

In an exemplary embodiment, the valve assembly 1000 is primarily constructed of plastic material, which yields cost savings in manufacture and production. However, nothing herein shall be deemed to be a disclaimer of valve assemblies (or any other component discussed herein) made from any other materials. Indeed, suitable alternative materials, now know or later developed, may be used to construct the valve assembly 1000, in part or in whole.

In an exemplary embodiment, the automatic water system of the present invention (including the valve assembly 1000) is constructed of materials that can withstand autoclaving temperatures of up to 270 degrees Fahrenheit. Preferably, all materials are autoclaveable to 270° F., including the flexible hose manifold lines, the micron filter (described further below), and the injection molded plastic components. Injection molded high performance plastic valve components and manifold fittings are preferably molded using engineered plastics and withstand repeated autoclavings at 270° F. In preferred embodiments, the manifold and all materials can withstand over 10 years of autoclave cycles and/or can pass a 10 year rapid age test (e.g., elevated temperature and chlorine levels for 61 days to simulate 10 years of life) indicating a useful life in excess of 10 years without any detrimental breakdown in materials. An exemplary plastic that may be used for the injection molded components is Radel® polyphenylsulfone (e.g., R-5800); other similar materials may be used in alternative embodiments. The material and fit of the components are preferably selected to accommodate thermal expansions. Certain materials used in existing valves, such as polypropylene, may not be suitable.

In an exemplary embodiment, the valve assembly 1000 is constructed of materials that have good chemical resistance properties. Preferably, all materials are resistant to the chemicals used to treat water, clean and sanitize the units, etc. The use of primarily non-metallic materials can reduce the risk of system corrosion due to contact, for example, with high concentrations of chlorides and acids (citric acid, hydrochloric acid, etc.) which are commonly used to treat laboratory water supplies.

In an exemplary embodiment, with reference to FIGS. 2-5 and 20-21, the valve assembly may further comprise a valve shield 1007. The valve shield 1007 (e.g., a thin wall stainless steel deep drawn cover) is preferably provided to cover the portion of the valve assembly 1000 exposed to the animals to prevent the animals from chewing on the valve assembly 1000 but can also be designed and constructed to cover as much of the valve assembly as may be desirable for system configurations (e.g., for mounting within the cage, on the rack, etc.). Preferably, the valve shield 1007 is made of a metallic material or other suitable types of chew-resistant material now known or later developed. In some embodiments, valve shield 1007 is sized and shaped to fit the profile of the plastic end cap 1006 and the valve body 1001 when assembled. Clearance may be provided between the metallic valve shield and the plastic sub-assembly (1001 and 1006) to accommodate difference in thermal expansion during autoclave. In some embodiments, valve shield 1007 is held in permanently in place via a crimp/dimple at the base, so that it is permanently attached to the valve (permanently crimped over the plastic valve body), and is not removable to facilitate cleaning, repair, replacement, etc. This crimp/dimple is preferably formed after the shield has been placed over the plastic. FIG. 8 shows exemplary locking dimples 1077 created at assembly. In some embodiments, valve shield 1007 may be marked (e.g., engraved, or preferably laser etched) with identifying information, such as the date of manufacture, serial number, date of recommended replacement or other pertinent information.

Figure 41:
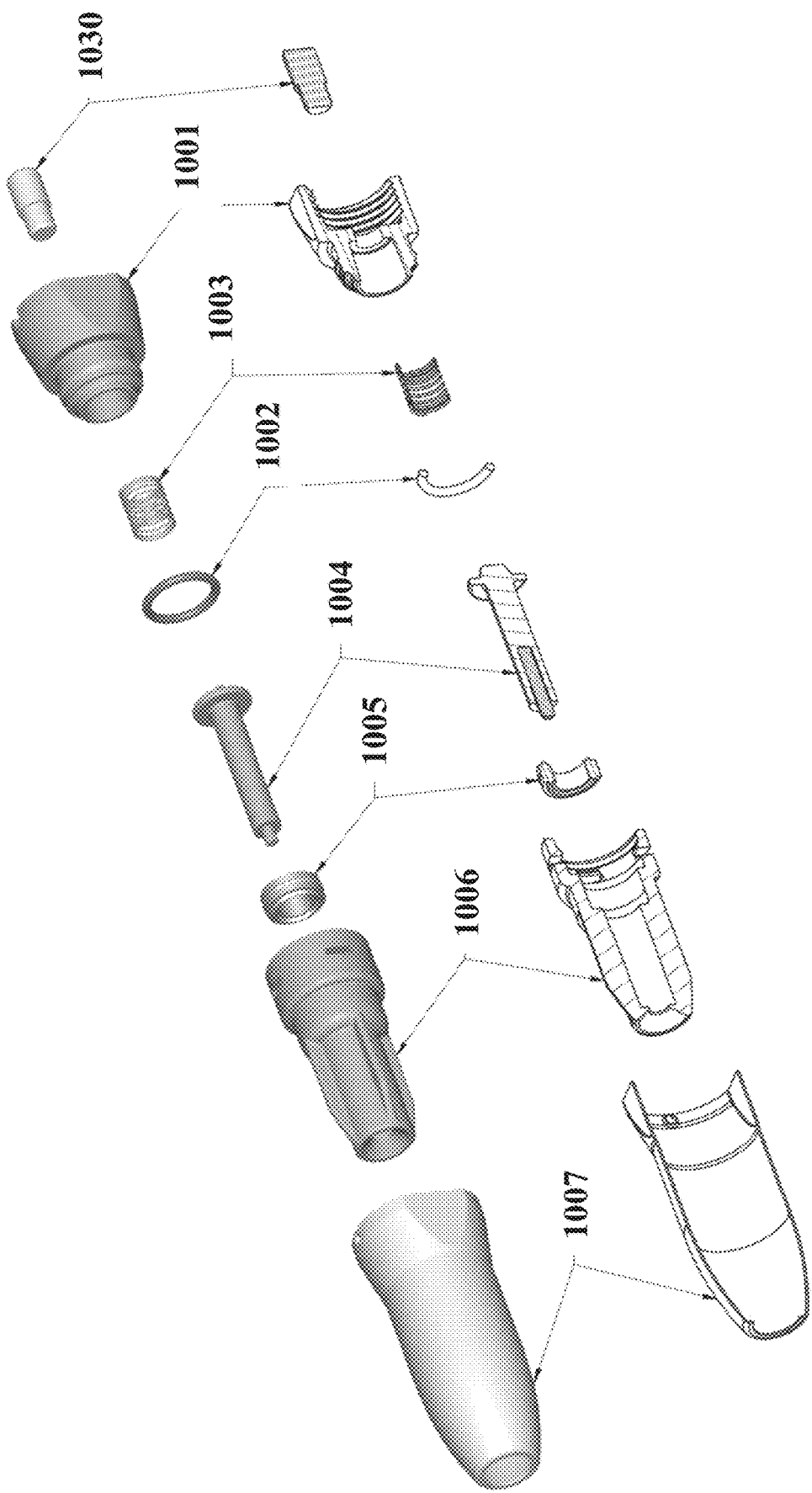
FIG. 41 is an exploded perspective view and exploded cross-section view of an embodiment of a snap fit valve assembly with internal filter.
Figure 58:
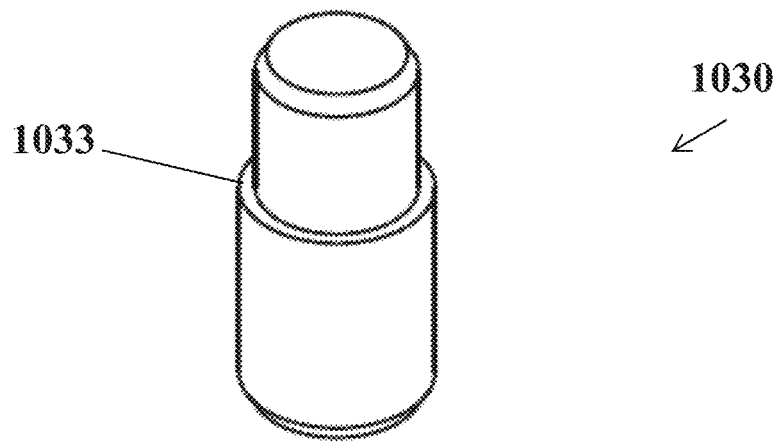
FIG. 58 is a perspective view of an embodiment of a micron filter of a valve assembly.

In an exemplary embodiment, the valve assembly 1000 may further comprise an internal replaceable micron level water filter comprising Porex or like material, which may be custom made to specified dimensions. FIG. 41 shows an exploded view of a valve assembly 1000 having a porous plastic filter 1030, in which valve body 1001 and end cap 1006 are configured to snap fit together as described above. The filter 1030 is preferably molded using a process that creates a porous part carrying a micron rating. The pore size of filter 1030 can be varied; accordingly, filter 1030 can have various micron ratings such as, but not limited to, a 40 micron average rating. In some embodiments, filter 1030 can be punched from sheet material. Filter 1030 is installed in the rear (distal end) of the valve assembly. The filter 1030 is positioned so that it can arrest particulate matter that could be contained in the supply water. The filter 1030 can also protect against any foreign material getting into the valve while handling the valve. The filter 1030 can also set/modulate the flow rate through the valve assembly. In some embodiments, filter 1030 may be installed (e.g., friction fit/press fit) in valve body 1001 prior to the rest of the valve assembly, to keep the valve clean when assembled. Filter 1030 is replaceable. Filter 1030 has a three-dimensional shape, such as, but not limited to, the generally cylindrical shape shown in FIGS. 41 and 58. A three-dimensional shape provides more surface area for filtration, as compared to flat filters, which can get plugged up easily. In some embodiments, filter 1030 may be stepped/tiered to provide a ledge 1033 (see FIG. 58) to keep the filter in place within valve body 1001. In some embodiments, the filter 1030 may have beveled ends and/or may be tumbled to break sharp corners.

Valve assembly 1000 is generally configured to work with a normal supply water pressure of 3-5 PSI during normal operation and has an activation force of about 3-6 grams with this supply water pressure. Higher water pressure increases the seal force of the valve at the seat. The valve typically experiences supply water pressures of about 15-20 PSI during a high pressure water system flush, which can happen about 1-2 times a day. For a short duration the user can open a valve and let water flow through multiple cage units/racks at an increased pressure to keep all lines filled with fresh water and to prevent the build-up of bio-film in the waterlines. During the high pressure flush the activation force of the valve is increased.

Figure 23:
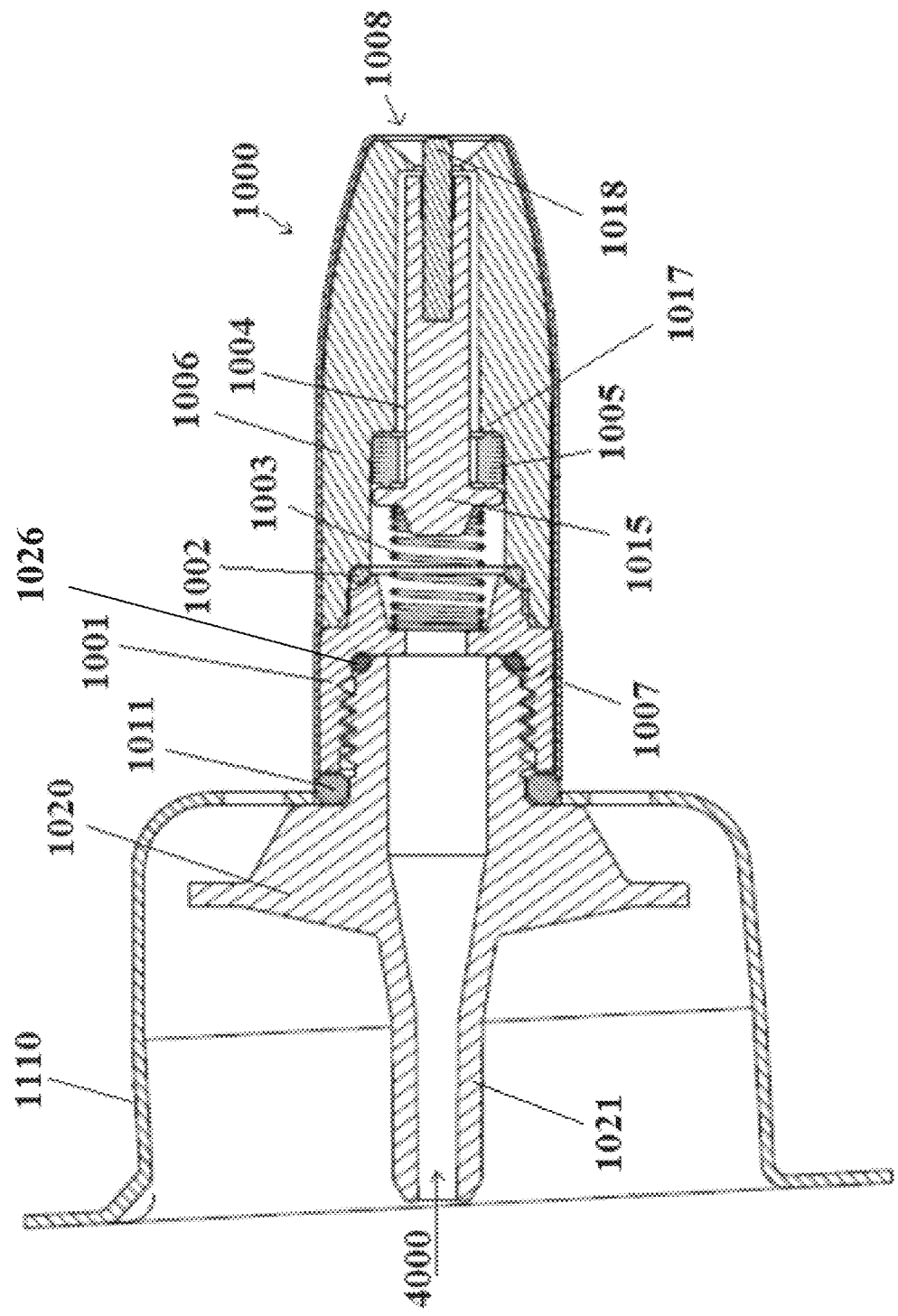
FIG. 23 is a cross-section view of an embodiment of a valve assembly mounted in a grommet with a valve stem.
Figure 43:
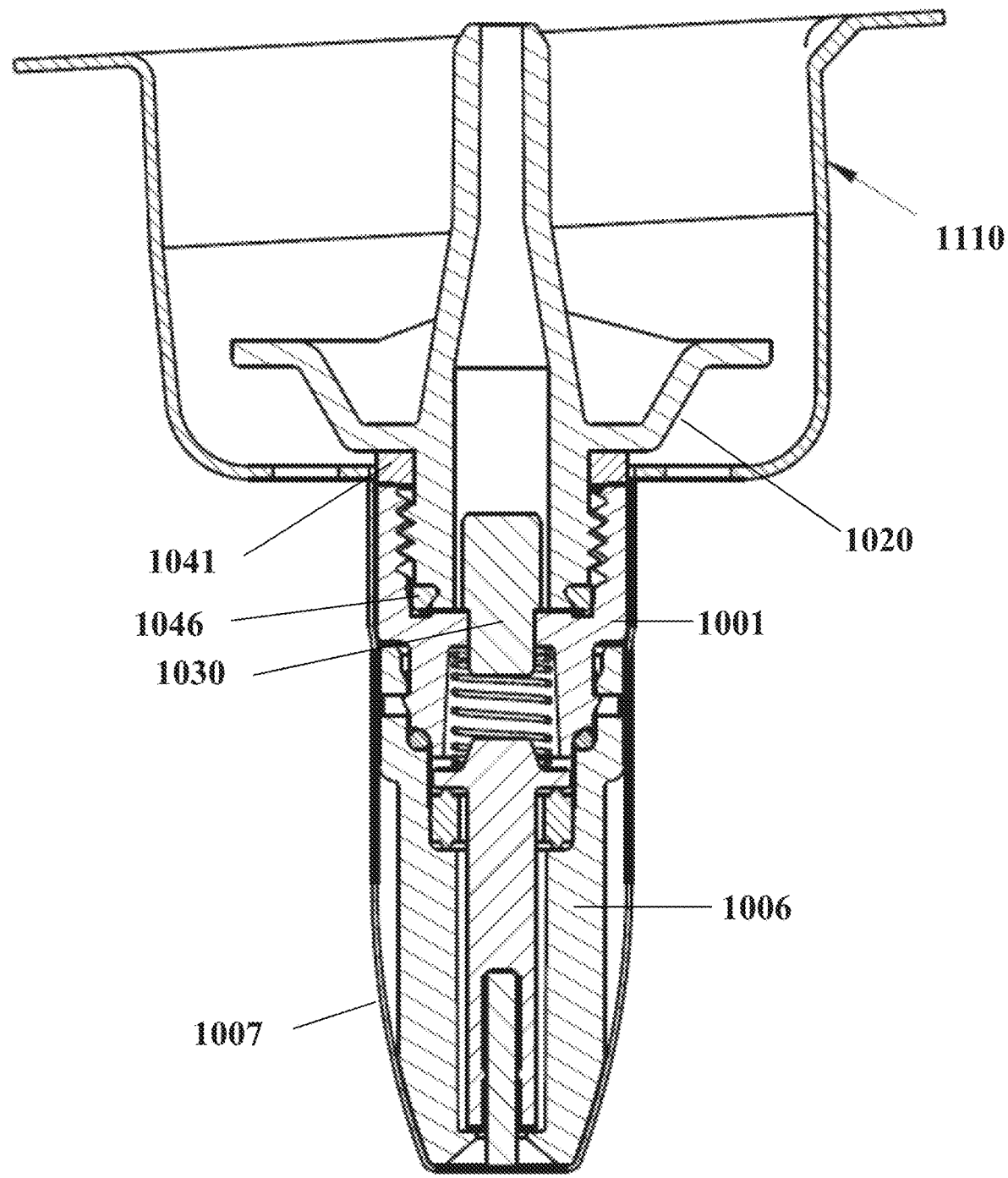
FIG. 43 is a cross-section view of an embodiment of a snap fit valve assembly mounted in a grommet with a valve stem having sealing elements integrally molded thereto.

In an exemplary embodiment, with reference to FIGS. 2-3, 22-26, in use, the valve assembly 1000 is mounted in the interior of an animal cage 1100 having an air grommet 1110, where the animals can access the valve assembly 1000 to obtain fluids. The grommet 1110 permits the animal cage 1100 to be docked in high-density racks, such as caging rack system 600. The grommet 1110 may be disposed in one of the sidewalls of the cage 1100 and allows air and/or water to flow into the cage 1100. In one embodiment, to mount the valve assembly 1000, the valve assembly 1000 is placed in the interior of the cage 1100 adjacent to the grommet 1110 such that the jam-preventing opening 1008 is accessible to the animals. A valve stem 1020 (preferably made of injected molded plastic as described above), which defines a fluid channel 4000, is positioned on the exterior of the cage 1100 proximate the grommet 1110. As shown in FIGS. 23 and 43, one end of valve stem 1020 is configured to releasably couple to (e.g., thread onto) the rear (inner/distal end) of valve body 1001 in valve assembly 1000, for example with screw threads 2023 on valve stem 1020 (see FIGS. 24 and 44-45) and screw threads 2022 on valve body 1001 (see FIGS. 15 and 54). Valve stem 1020 allows removal of the cage from the housing unit by activating the front mounted cage latch and pulling the cage outward (towards the user); the user does not need to manipulate any part of the quick disconnect (QD) connection (described in further detail below). Valve stem 1020 also functions as a means to control airflow into the cage at the supply air grommet of the ventilated housing unit (e.g., stop air from freely entering the cage when it is removed from the rack) and retain the porous filter located within the valve (described above). An outer portion 1025 of valve stem 1020 serves as the baffle plate, providing an air baffle to create a tortuous path for air flow to prevent non-sterile room air from entering the cage 1100 when the cage is removed from the ventilated housing unit and to facilitate the creation of a more uniform and balanced airflow (e.g., so that HEPA filtered supply air is forced around the baffle, providing airflow that is void of high velocity vectors of air) into the cage 1100. Baffle plates are typically a separate component; the present invention provides a unitary construction in which valve stem 1020 also serves as the baffle plate.

As shown, for example, in FIG. 23, in some embodiments, an alignment element 1011 may be provided to be positioned between the valve stem 1020 and the grommet 1110 and/or between the valve assembly 1000 and the grommet 1110 to provide a flexible docking mechanism and allow flexibility within the grommet to allow the valve assembly 1000 some movement to facilitate alignment of the valve assembly 1000 with the quick disconnect element 1060 (discussed below) when the cages 1100 are docked into a water system. The alignment element allows the valve stem 1020 to move so that it is not rigid in the grommet, so that when assembled with the valve assembly 1000 and docked in the quick disconnect element 1060 on the manifold 1050, it does not have to align perfectly. A sealing element 1026 may be provided to be positioned at the tip of the screw threads 2023, between the proximal end of the valve stem 1020 and the valve assembly 1000, to form a water-tight seal.

Figure 24:
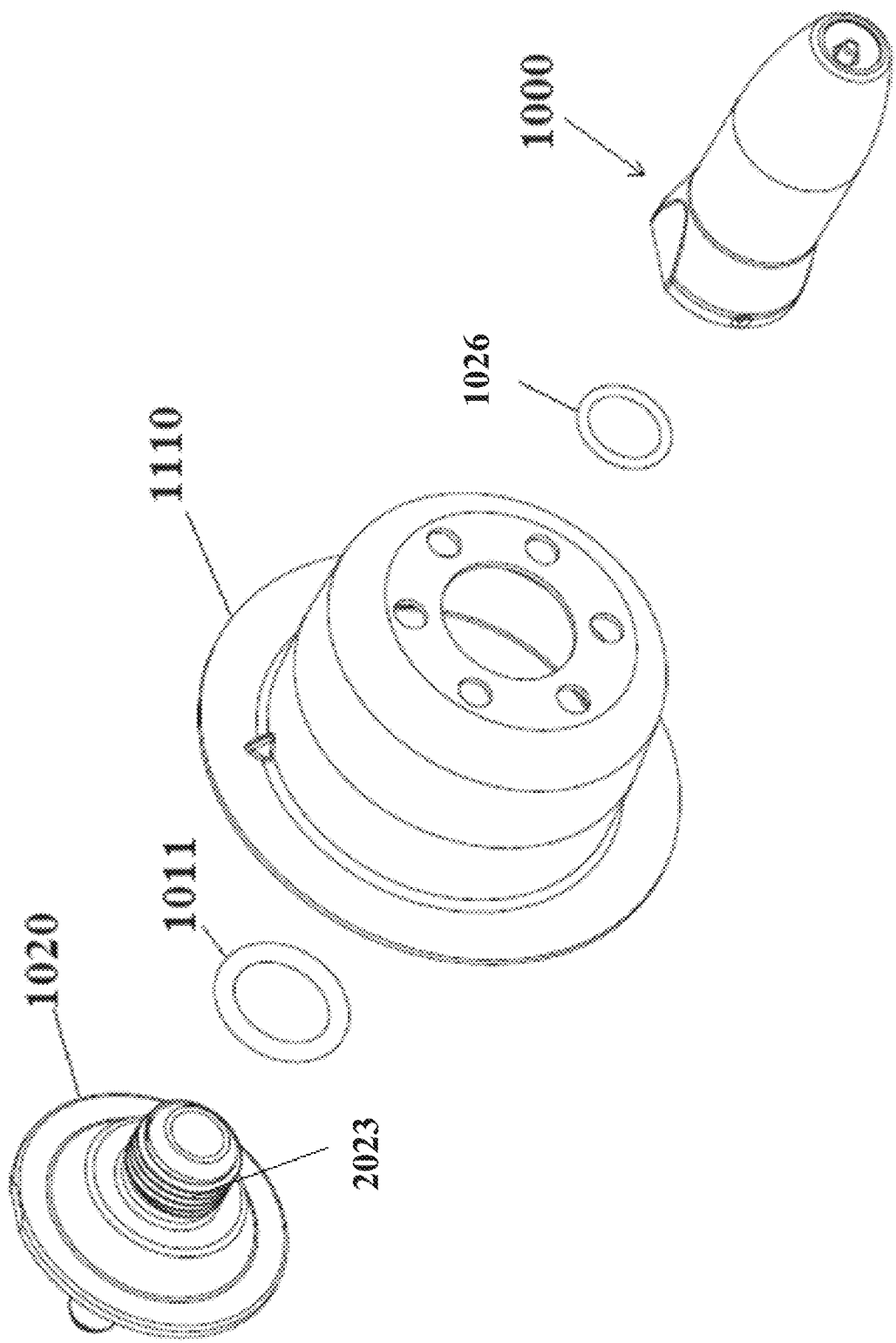
FIG. 24 is an exploded perspective view of an embodiment of a valve assembly, grommet, and valve stem.
Figure 25:
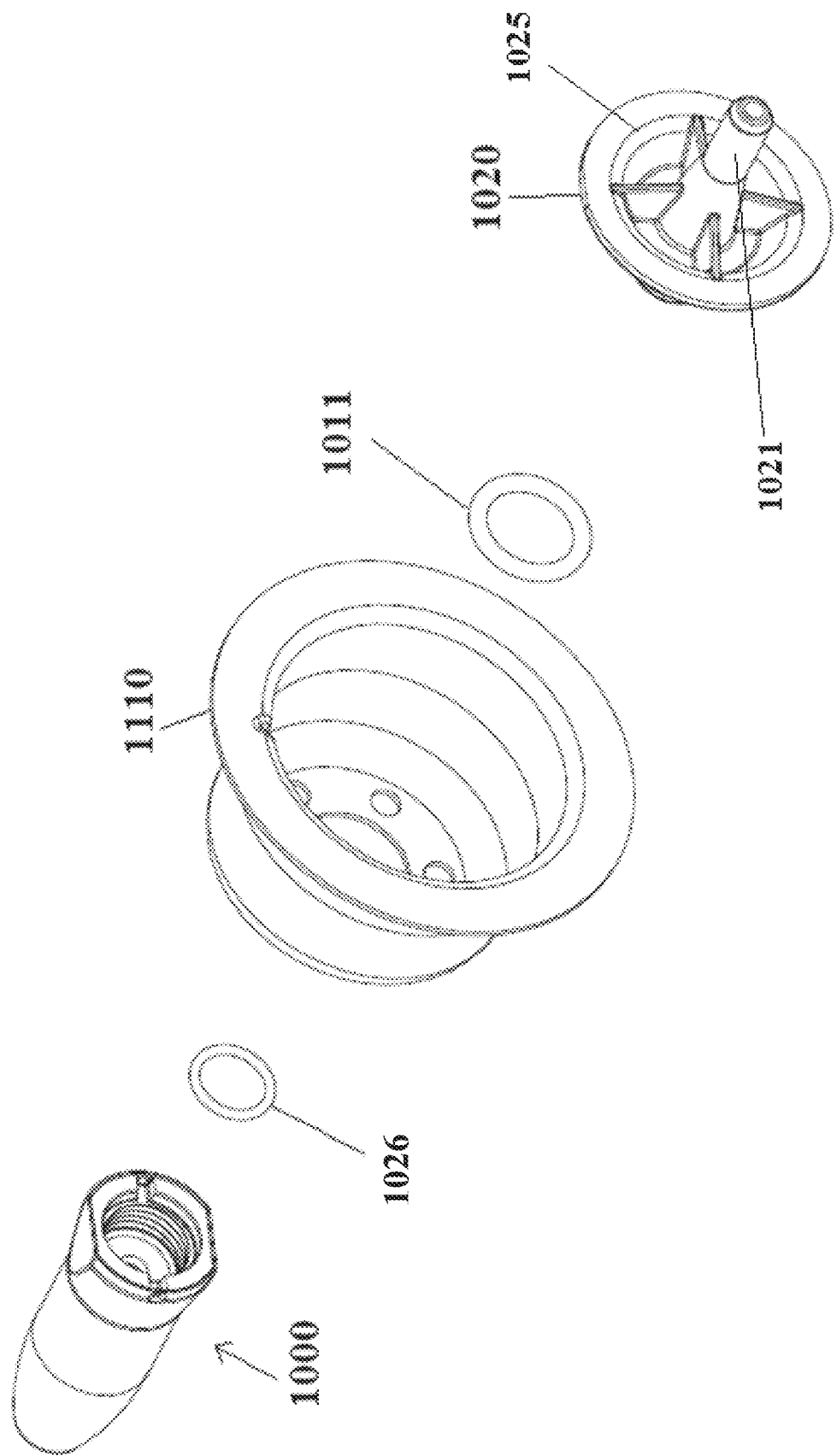
FIG. 25 is an exploded perspective view of an embodiment of a valve assembly, grommet, and valve stem.
Figure 26:
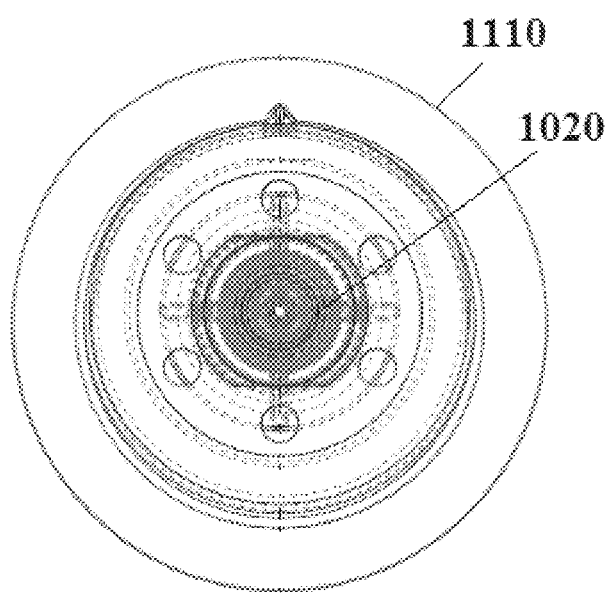
FIG. 26 is a front view of an embodiment of a valve assembly, grommet, and valve stem.
Figure 27:
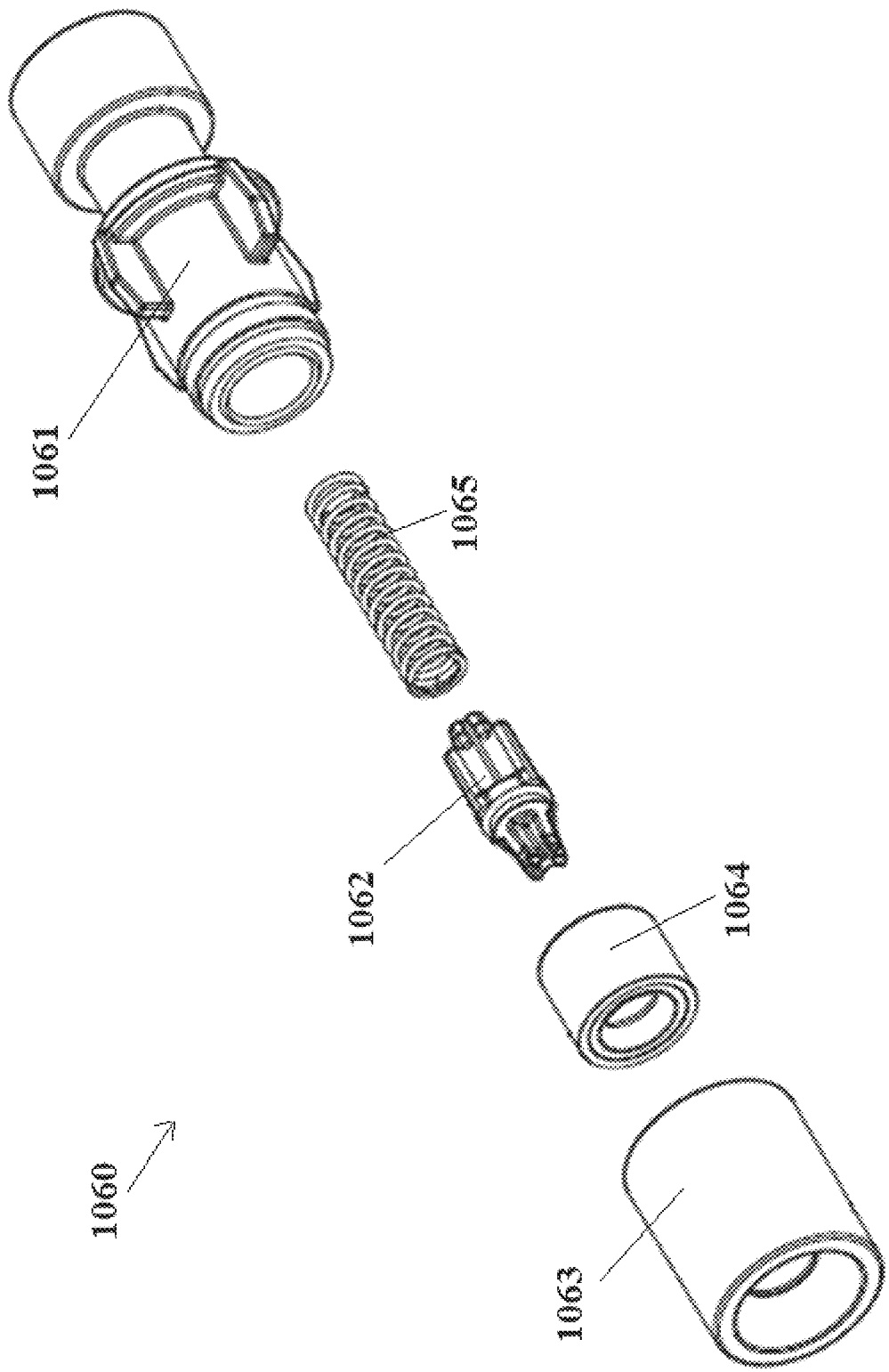
FIG. 27 is an exploded perspective view of an embodiment of a quick disconnect element.
Figure 28:
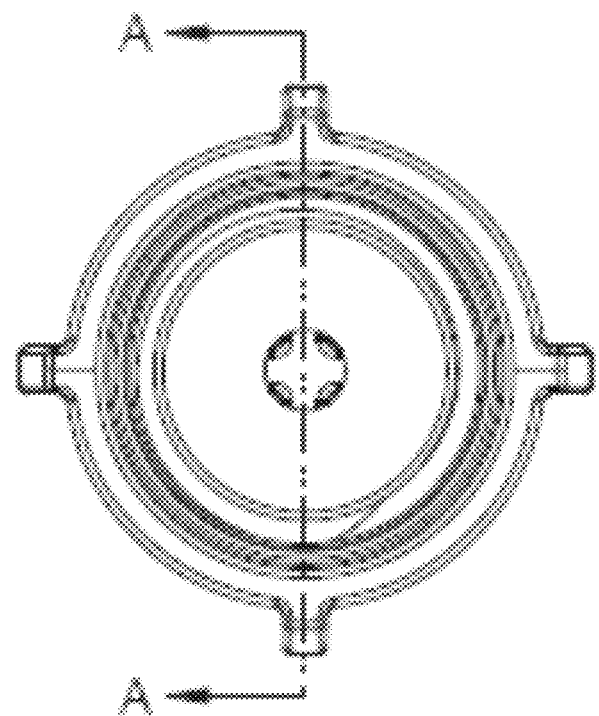
FIG. 28 is a rear view of an embodiment of a quick disconnect element.
Figure 29:
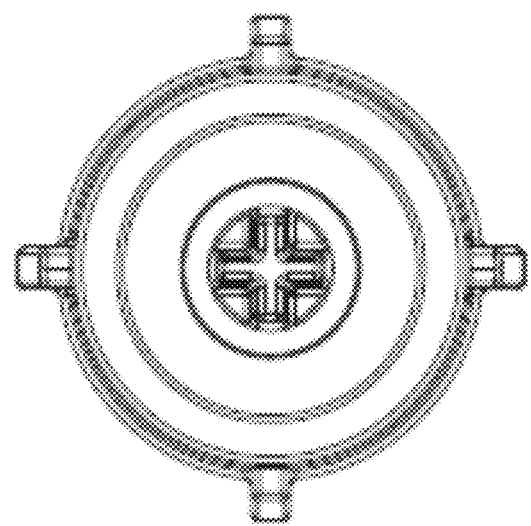
FIG. 29 is a front view of an embodiment of a quick disconnect element.
Figure 44:
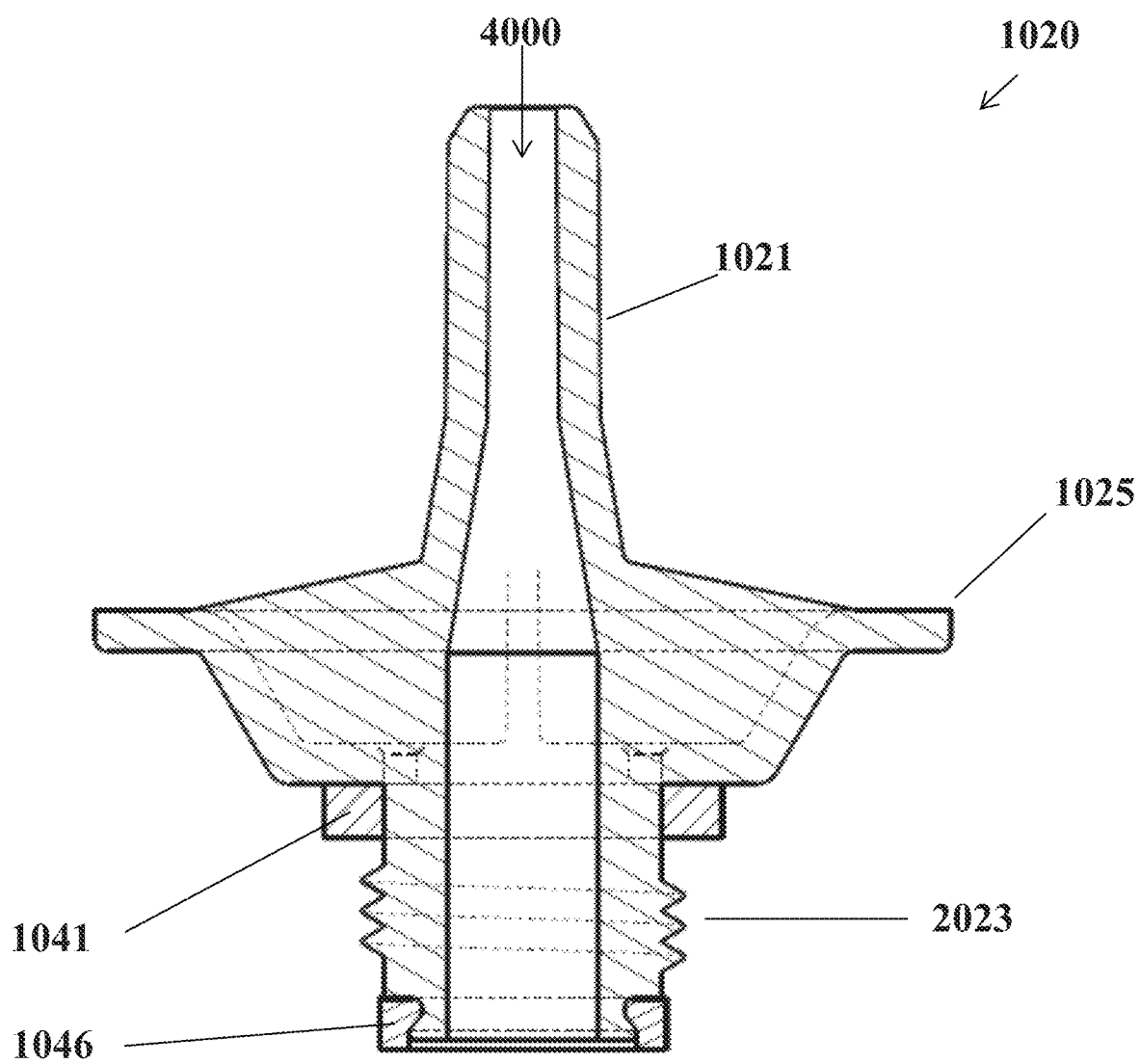
FIG. 44 is a cross-section view of an embodiment of a valve stem having sealing elements integrally molded thereto.
Figure 45:
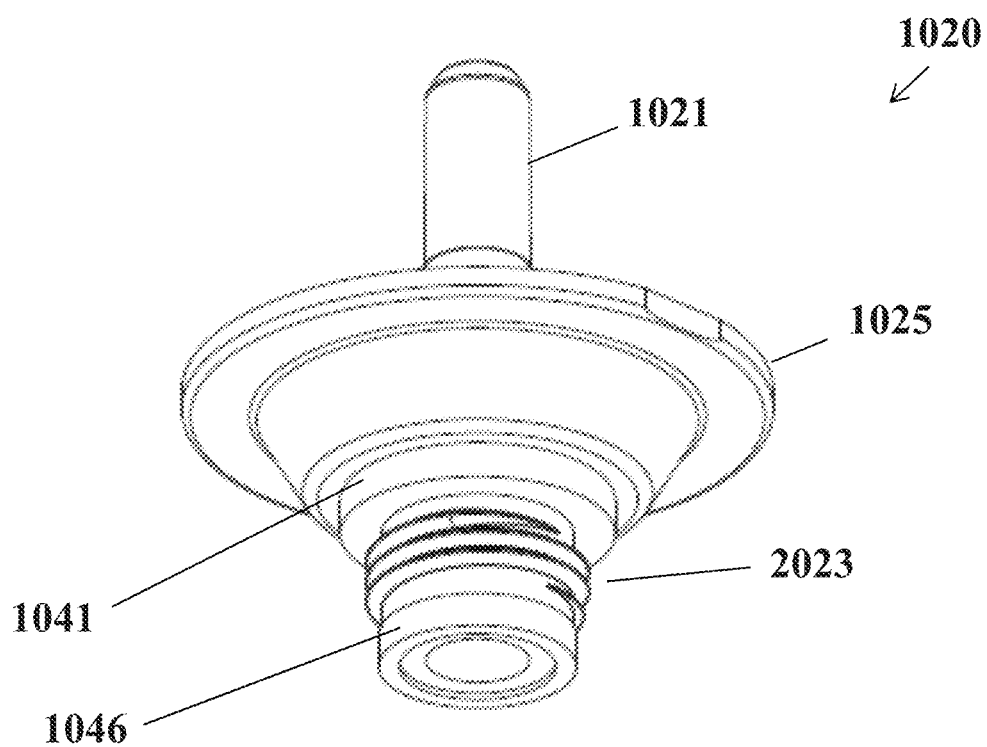
FIG. 45 is a perspective view of an embodiment of a valve stem having sealing elements integrally molded thereto.
Figure 46:
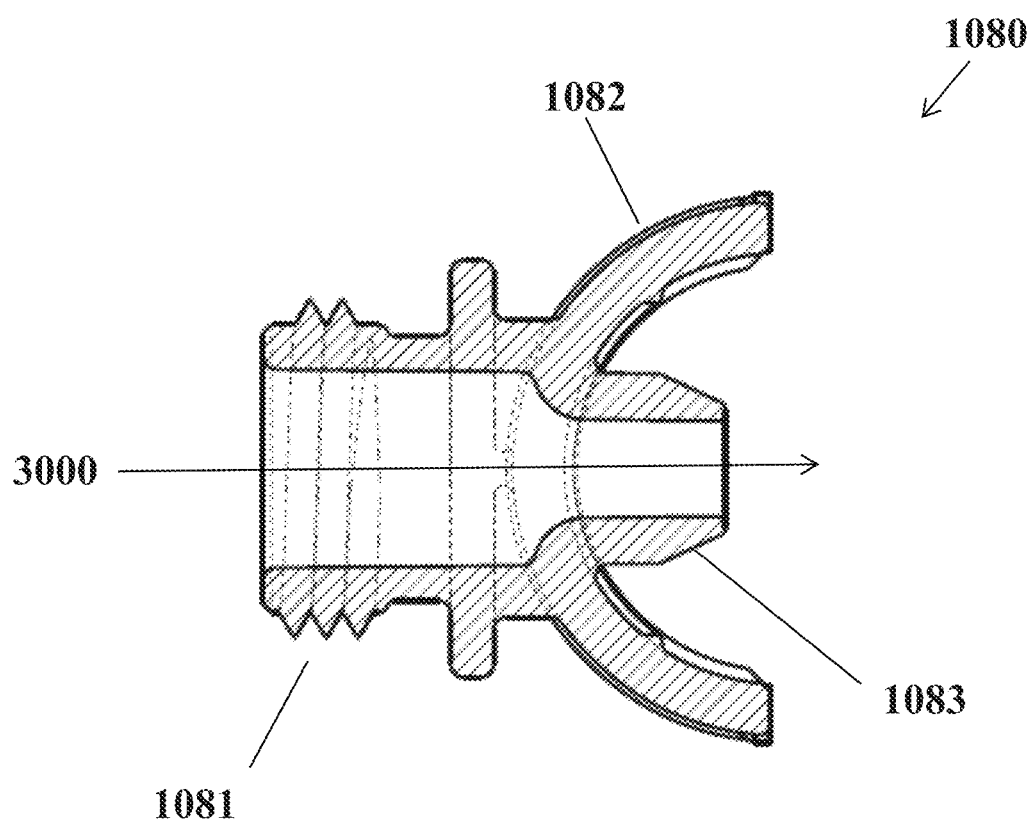
FIG. 46 is a cross-section view of the embodiment of a saddle fitting shown in FIGS. 32 and 33.
Figure 47:
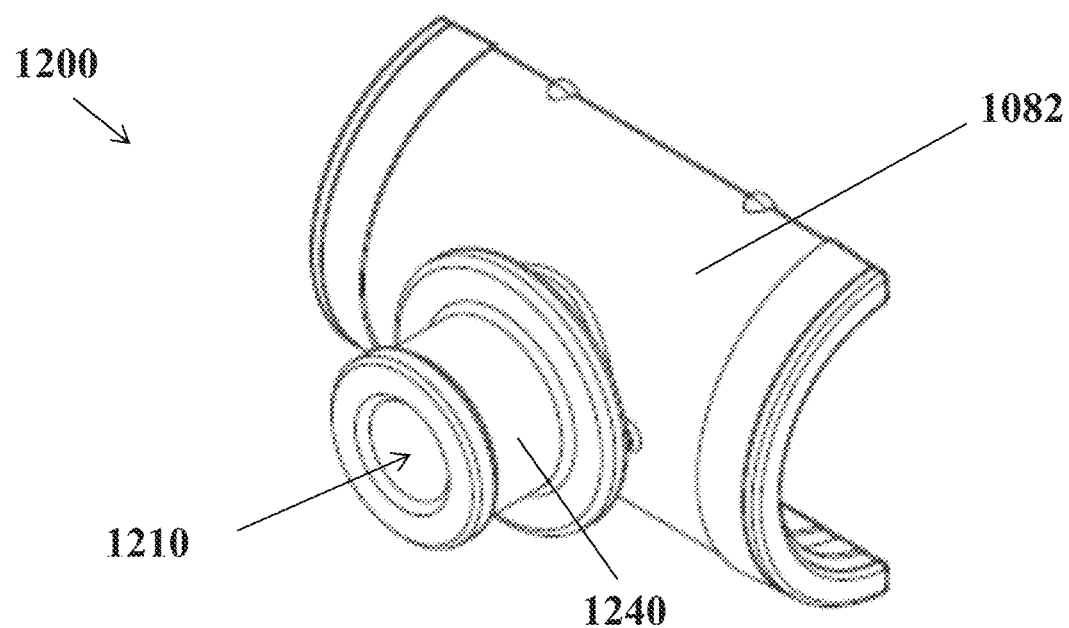
FIG. 47 is a front perspective view of an embodiment of a saddle fitting.
Figure 48:
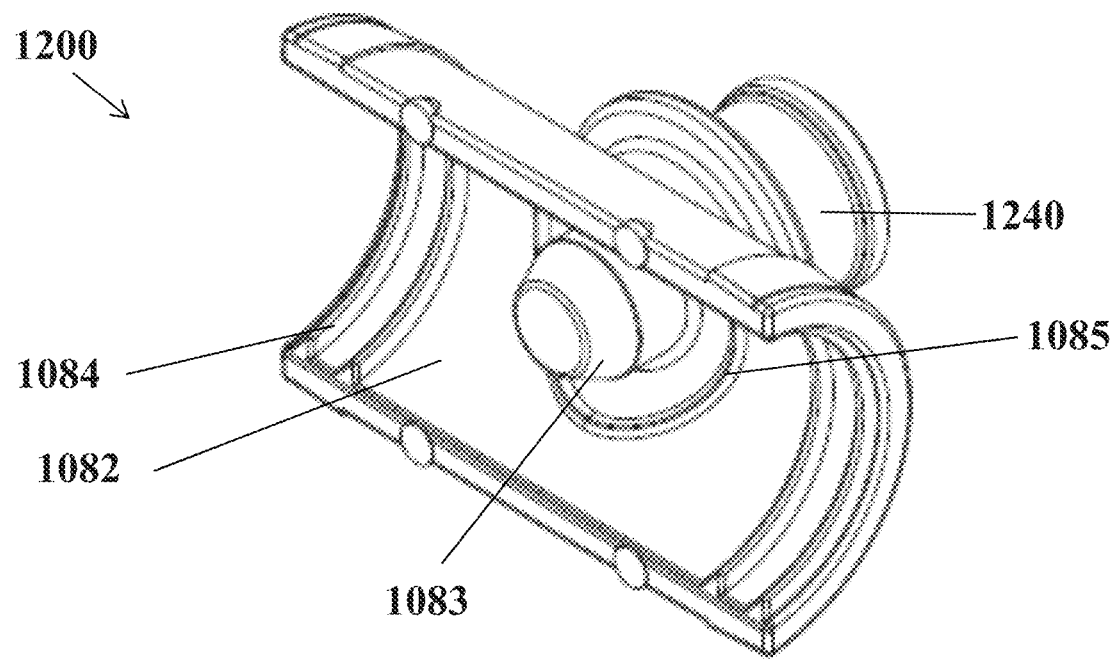
FIG. 48 is a rear perspective view of an embodiment of a saddle fitting.

In some embodiments, as shown in FIGS. 23-25, the alignment element 1011 and the sealing element 1026 may be separate detachable elements, such as friction-fit O-rings, which are separate and detachable from valve stem 1020. In other embodiments, as shown in FIGS. 43-45, an alignment element 1041 and/or a sealing element 1046 may be provided, which are injection molded (and thus permanently attached) to the valve stem 1020. For example, a proximal molded element comprising a sealing element 1046 below/at the tip of the screw threads 2023, to be positioned inside the valve body 1001 (see FIG. 43), may comprise a seal that is molded in place into an undercut in the plastic of valve stem 1020 (see FIG. 44). These components may be molded at the same time, so that the sealing element 1046 is permanently affixed to valve stem 1020 and can form a seal for sealing water. A distal molded element comprising an alignment element 1041 above the screw threads 2023, to be positioned above the valve body 1001 proximate the grommet 1110 (see FIG. 43), may be molded in place similar to the sealing element. Alignment element 1041 may comprise, for example, an annular seal that may be molded through holes in the baffle 1025 so that it is bonded on. Molding alignment element 1041 and sealing element 1046 to the valve stem 1020 can aid in assembly by providing fewer parts to assemble and better seal alignment. In some embodiments, the injection molded seal material for the alignment element 1041 and the sealing element 1046 comprises a Sarlink® thermoplastic elastomer/thermoplastic vulcanizate, but other suitable materials with similar mechanical and molding properties could be used in alternative embodiments. In some embodiments, the manufacturing process comprises a two-stage molding, wherein the body of valve stem 1020 is molded first, and then is placed into another mold where the alignment element 1041 and the sealing element 1046 are molded onto the body. In other embodiments, the valve stem 1020 could remain in its original mold and a second injection could be utilized to mold the alignment element 1041 and the sealing element 1046 thereto. Injection molded alignment and sealing elements 1041 and 1046 are permanent, and stay on the valve stem 1020 when the valve assembly 1000 is changed out.

The valve stem 1020 may be connected to the valve assembly 1000 by various suitable means. Preferably the valve body 1001 of the valve assembly 1000 and the valve stem 1020 each include screw threads (2022 and 2023, respectively), which may be used to screw the valve assembly 1000 and valve stem 1020 together to mount the valve assembly 1000 on a wall of the cage 1100 at the position of the grommet 1110 (see, e.g., FIGS. 3 and 23). Screw threads 2022 and 2023 allow quick assembly and/or disassembly of the valve body 1000 and valve stem 1020.

In an exemplary embodiment, with reference to FIGS. 3 and 25, the valve stem 1020 includes an elongated portion 1021 that is designed and constructed to interface with a quick disconnect (QD) element 1060, which is connected to a water supply manifold 1050 and permits fluid from the water supply manifold 1050 to flow to the valve assembly 1000. In preferred embodiments, the QD element can withstand a 10 year age test (e.g., cycle testing, docking and undocking with valve assembly 3750+ times without any measurable wear or failures, equivalent to removing the cage from the rack once per day for over 10 years).

With reference to FIGS. 27-31, in an exemplary embodiment, the QD element 1060 includes a QD body 1061, QD plunger 1062, QD cap 1063 having an opening 1071, a QD sealing element 1064 and a QD spring element 1065. The QD spring element 1065 is preferably stainless steel, and the QD sealing element 1064 is preferably silicone or other like material. The other parts are preferably injection molded high performance plastic as described above for valve assembly 1000. The QD element 1060 defines a fluid channel 2000 through which fluid may flow into and out of the QD element 1060 in direction G (see FIG. 30).

In an exemplary embodiment, the QD body 1061 is joined with the QD cap 1063. They may be joined via sonic welding or by similar means known to those of ordinary skill in the art. In some embodiments, the QD body 1061 may be joined with the QD cap 1063 by snap fitting the two parts together as described above for valve body 1001 and end cap 1006. For these snap-fit embodiments, injection molds for QD body 1061 and QD cap 1063 may be modified to include interlocking features that can lock together when the two pieces are pressed together with force. An O-ring may be provided to create a seal between the two parts when they are snapped together. The QD body 1061 preferably includes screw threads 1066 to permit the QD body 1061 to be coupled to other elements, such as saddle fitting 1080 as discussed further below. The QD body 1061 also includes shoulder 1067 having a bottom surface 1068, both of which are disposed in the fluid channel 2000.

Figure 30:
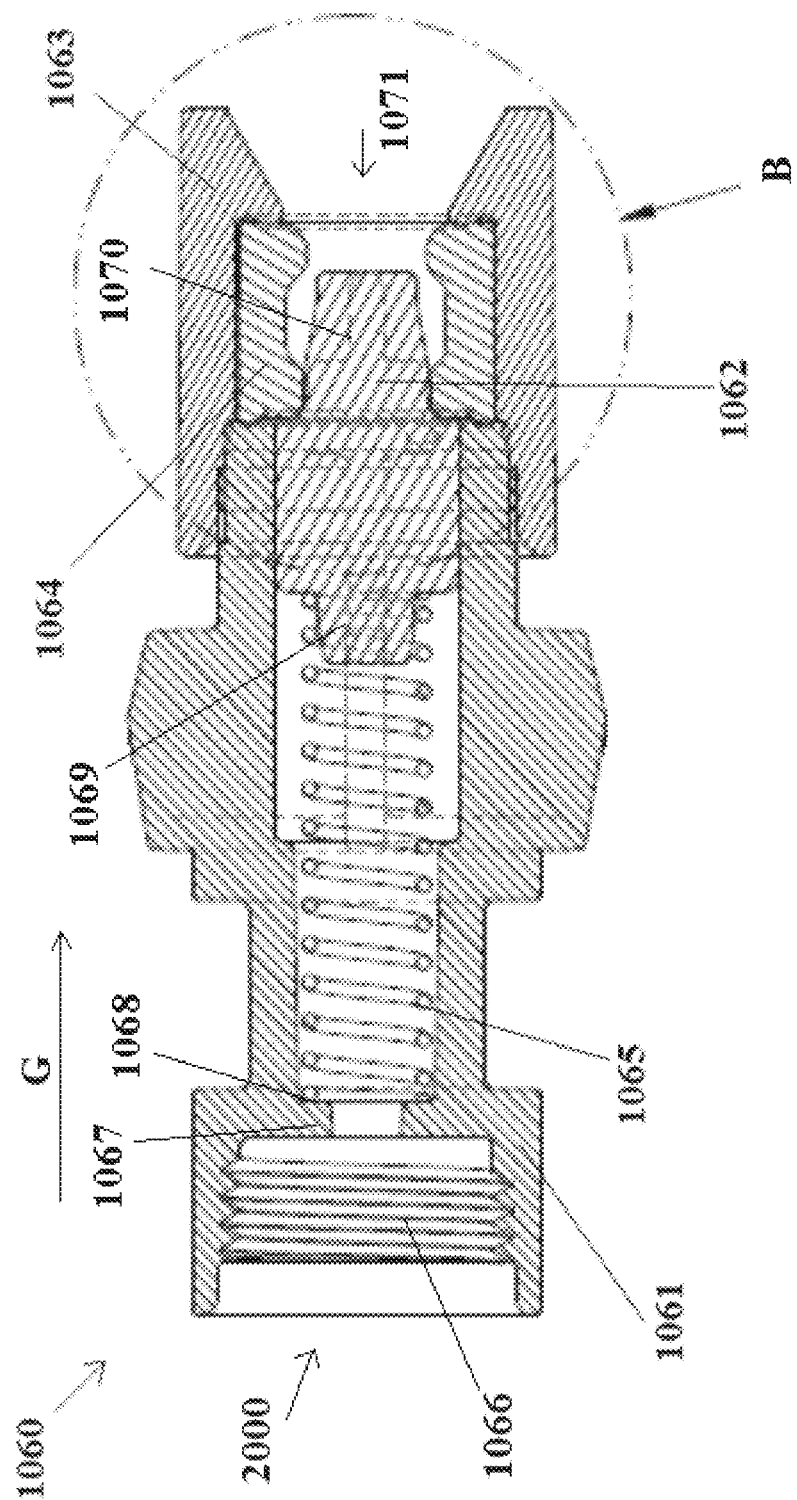
FIG. 30 is a cross-section view of the embodiment of a quick disconnect element shown in FIG. 28 along line A-A.
Figure 31:
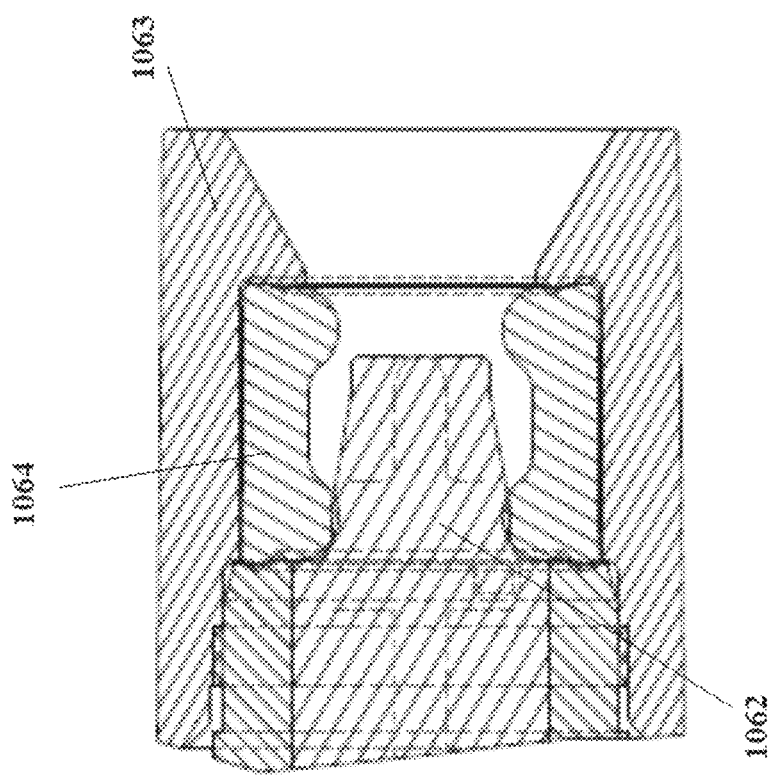
FIG. 31 is a detailed sectional view showing detail B of the embodiment of a quick disconnect element shown in FIG. 30.
Figure 32:
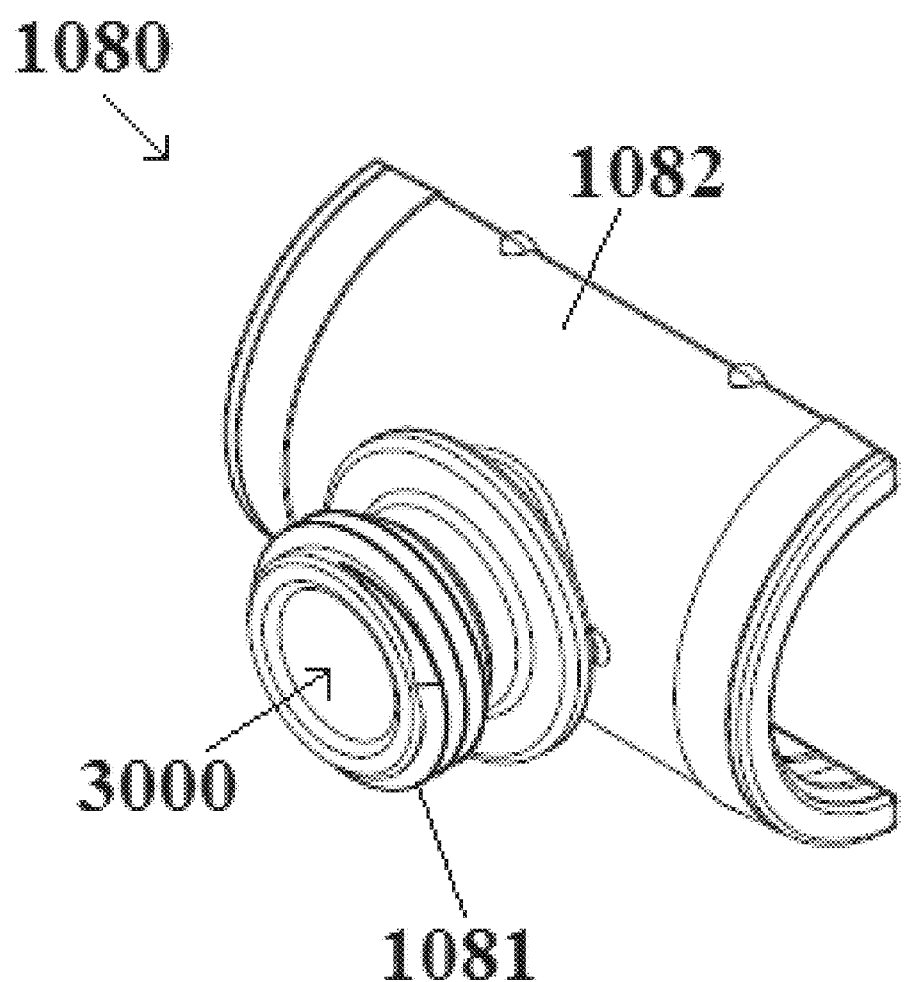
FIG. 32 is a front perspective view of an embodiment of a saddle fitting.
Figure 33:
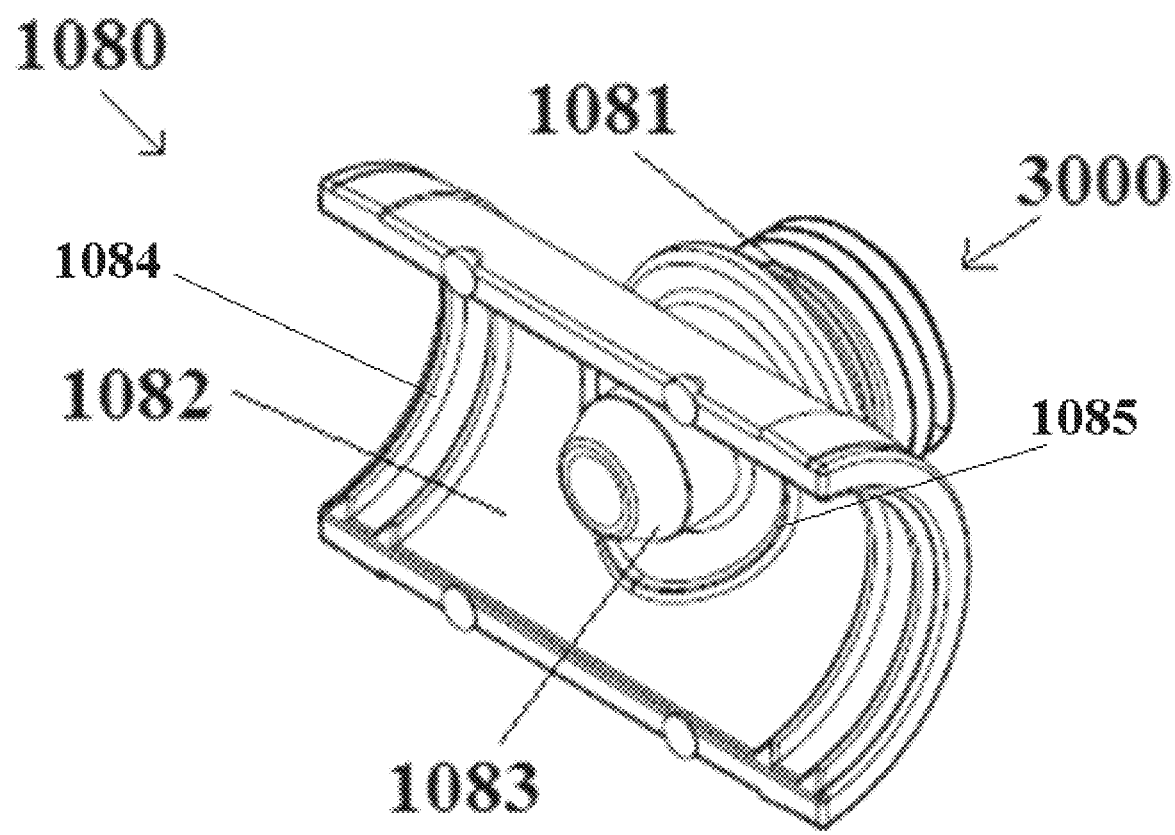
FIG. 33 is a rear perspective view of an embodiment of a saddle fitting.

In an exemplary embodiment, as shown in FIG. 30, the QD plunger 1062, QD sealing element 1064, and QD spring element 1065 are disposed between and within the QD body 1061 and QD cap 1063 (and within the fluid channel 2000) to permit the QD element 1060 to open and close, thereby permitting or restricting the flow of fluid through the fluid channel 2000. QD plunger 1062 has an internal end 1069 and exposed end 1070.

In an exemplary embodiment, when the QD element 1060 is in the closed position, one end of the spring element 1065 abuts bottom surface 1068 of the shoulder 1067 of the QD body 1062 and the other end of the spring element 1065 abuts a portion of the internal end 1069 of the QD plunger 1062. The spring element 1065 provides a biasing force in the direction G, thereby pushing the QD plunger 1062 toward opening 1071. This biasing force causes the QD plunger to make contact with the sealing element 1064, closing the fluid channel 2000. In an exemplary embodiment, the water pressure from water (or other fluids) form a water source entering the QD element 1060 may keep QD element 1060 sealed when it is in the closed position.

In an exemplary embodiment, with reference to FIG. 3, the QD element 1060 may be placed in the open position by valve stem 1020 when it makes contact with the valve stem 1020. The elongated portion 1021 of valve stem 1020 enters the opening 1071 of the QD cap 1063 and pushes against the exposed end 1070 of the QD plunger 1062. This causes the QD plunger 1062 to move toward the QD body 1061 and away from the sealing element 1064, opening the fluid channel 2000 and allowing fluids to pass through the QD element 1060.

In an exemplary embodiment, with reference to FIGS. 34-40, when installed in a cage and rack system 600, the QD element 1060 is provided within a docking assembly 680 that may be attached to an air supply plenum 610. The water supply manifold 1050 is disposed within the air supply plenum 610. The docking assembly 680 preferably includes one or more air holes 681 so that air can flow around the quick disconnect element and into the cage 1100. A saddle fitting 1080 may also be provided to connect the QD element 1060 to the water supply manifold 1050.

In an exemplary embodiment, with reference to FIGS. 32-40 and 46, the saddle fitting 1080 includes an attachment portion 1081 and a U-shaped portion 1082. The attachment portion 1081 defines a fluid channel 3000 therethrough to permit fluids to flow through the attachment portion 1081. The attachment portion 1081 is attachable to QD element 1060. In this regard, the attachment portion 1081 may include screw threads that may be screwed together with the screw threads 1066 in the QD body 1061. A sealing element 1088 (see FIGS. 3, 51) may also be provided between the QD element 1060 and the saddle fitting 1080 to protect against leakage.

In an exemplary embodiment, the U-shaped portion 1082 has a substantially U-shaped cross-section that is designed and configured to fit substantially over at least a portion of the water supply manifold 1050. The attachment portion 1081 includes a protrusion 1083 that extends inward from the U-shaped portion 1082. The protrusion 1083 is sized and configured to penetrate (e.g., press fit into) and seal to one of the apertures 1091 provided at predetermined locations along the water supply manifold 1050. As shown in the exemplary embodiment of FIG. 33, the saddle fitting 1080 may also include one or more grip ribs (side ribs) 1084, which facilitate gripping the saddle fitting 1080 to the water supply manifold 1050. The one or more grip ribs 1084 also serve to maintain the shape of the water supply manifold 1050 by preventing any movement of the saddle fitting 1080 from stretching or deforming the water supply manifold (e.g., lateral movement of the saddle fitting, stretching or deforming the aperture 1091, which can cause leakage). The saddle fitting 1080 may also include one or more sealing ribs 1085 to seal the saddle fitting 1080 to the water supply manifold 1050. Sealing ribs (radial ribs) 1085 are located radially about the protrusion 1083 that penetrates the aperture 1091 in the manifold line and provide a secondary seal around the outer diameter of the aperture 1091.

In an exemplary embodiment, with reference to FIG. 34, in two saddle fittings 1080 can be placed over the water supply manifold 1050 such that the protrusion 1083 of each saddle fitting 1080 is fitted (e.g., press fit) into an aperture 1091 of the water supply manifold 1050. In this configuration, the saddle fittings 1080 fit around a section of the water supply manifold 1050 and preferably encompass the circumference of the water supply manifold 1050. One or more locking rings 1090 may be placed around the saddle fittings 1080 proximate the edges of the U-shaped portion to hold the saddle fittings 1080 in place around the water supply manifold 1050. In some embodiments, saddle fittings 1080 may be made of injection molded plastic. Locking/retaining rings 1090 may be made, for example, of stainless steel. FIGS. 2-3, 34-40 show an exemplary assembly, wherein two saddle fittings 1080 and two QD elements 1060 are attached to manifold 1050 at two opposing air docks 680 along air supply plenum 610.

Figure 49:
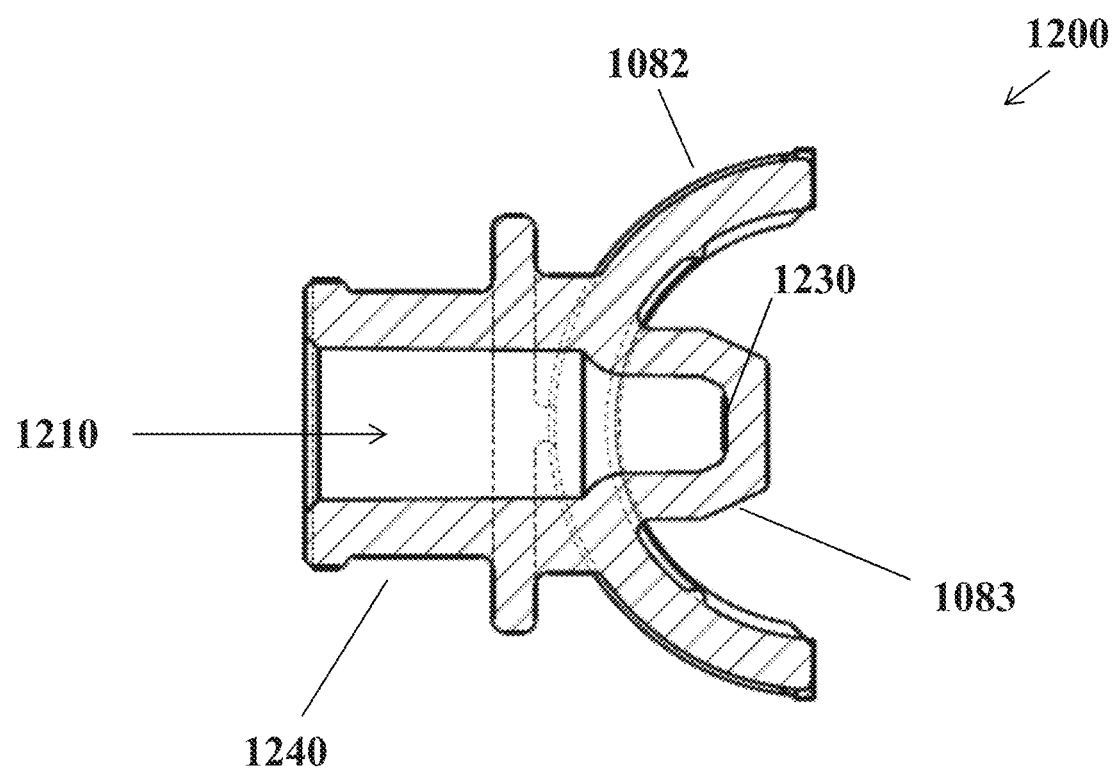
FIG. 49 is a cross-section view of the embodiment of a saddle fitting shown in FIGS. 47 and 48.
Figure 50:
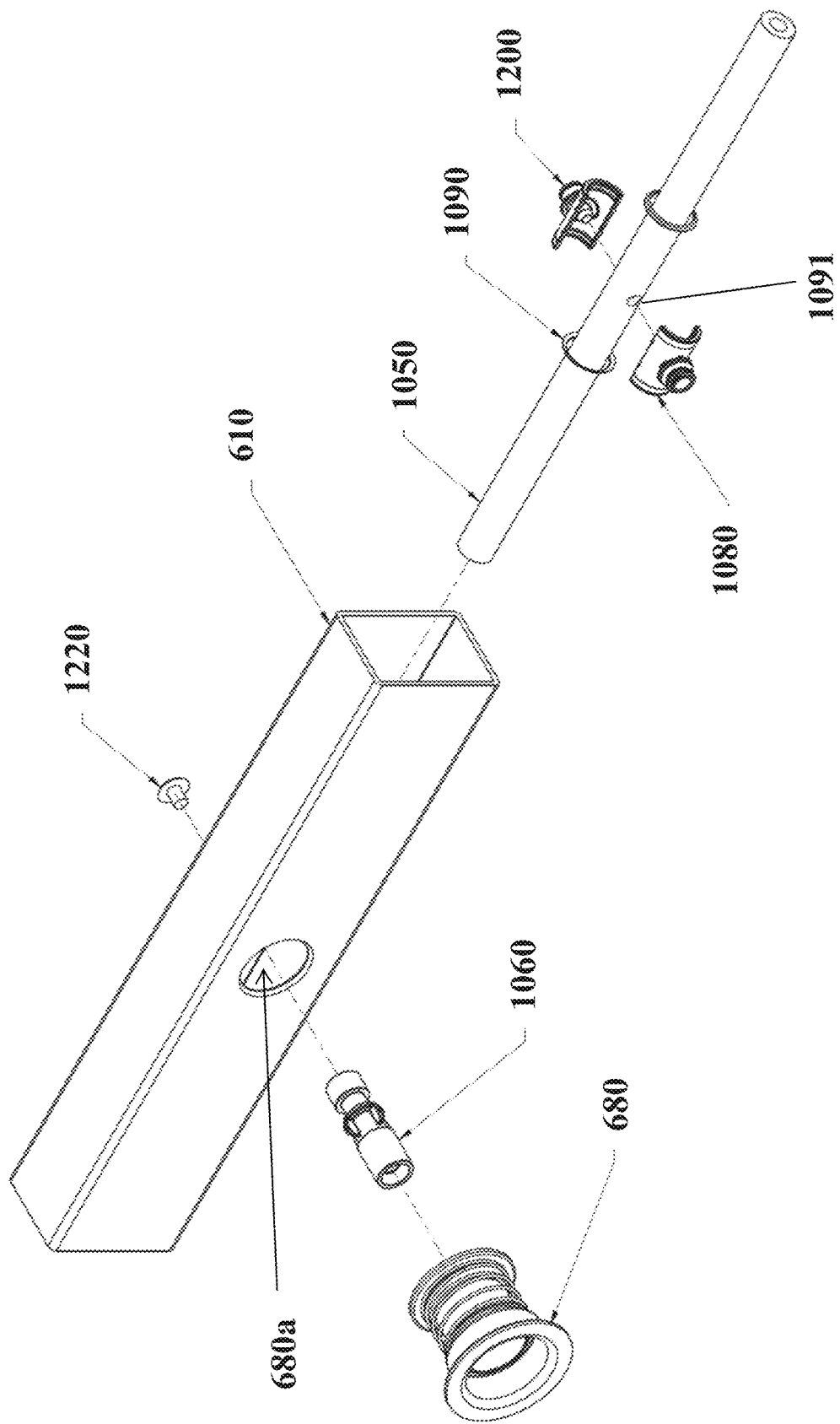
FIG. 50 is an exploded perspective view of an embodiment of an air supply plenum with a water supply manifold having a front saddle fitting, quick disconnect element, and docking assembly, and a rear saddle fitting and mounting screw.
Figure 51:
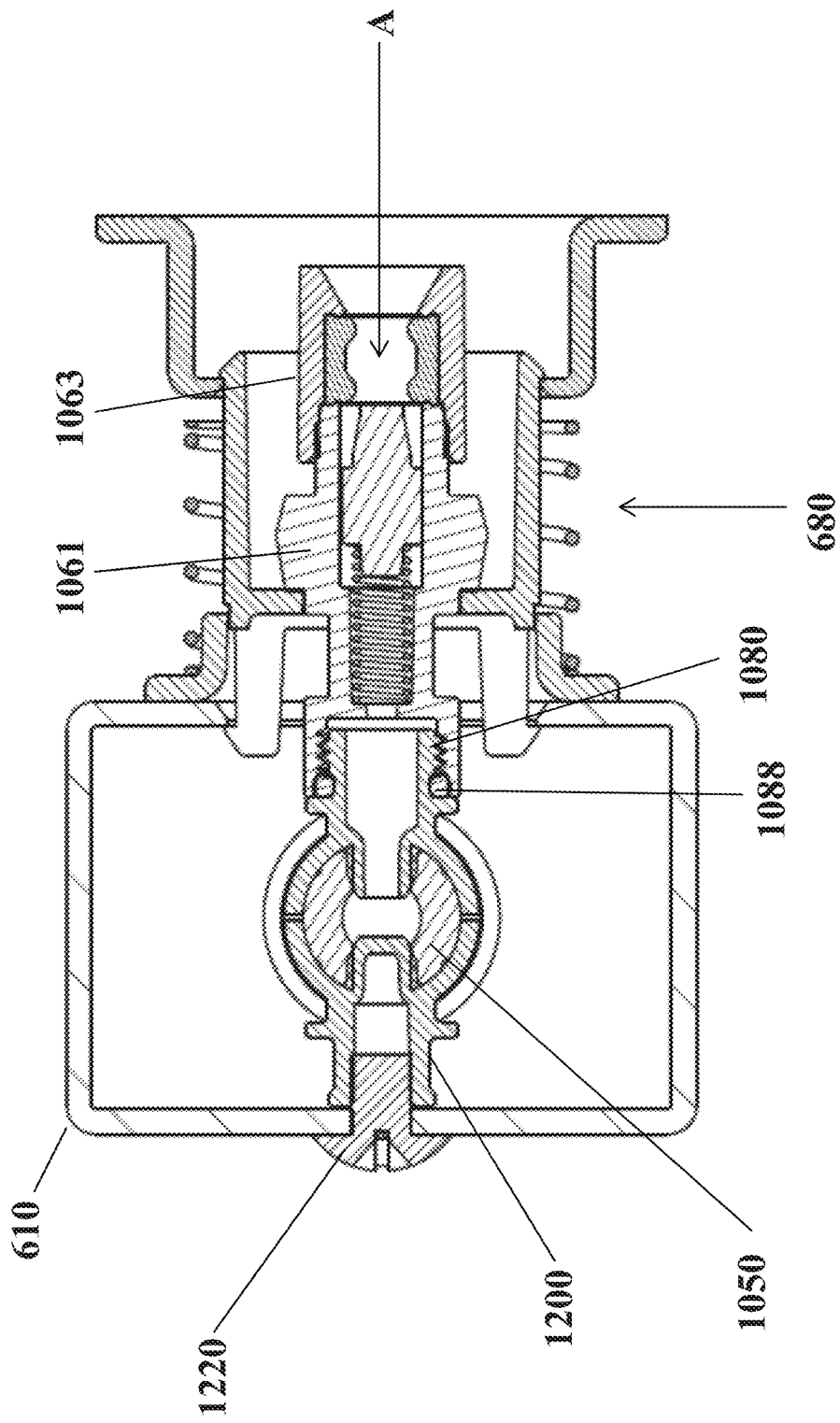
FIG. 51 is a cross-section view of the embodiment of an air supply plenum shown in FIG. 50 in assembled form, where a valve stem may be inserted at arrow A.
Figure 52:
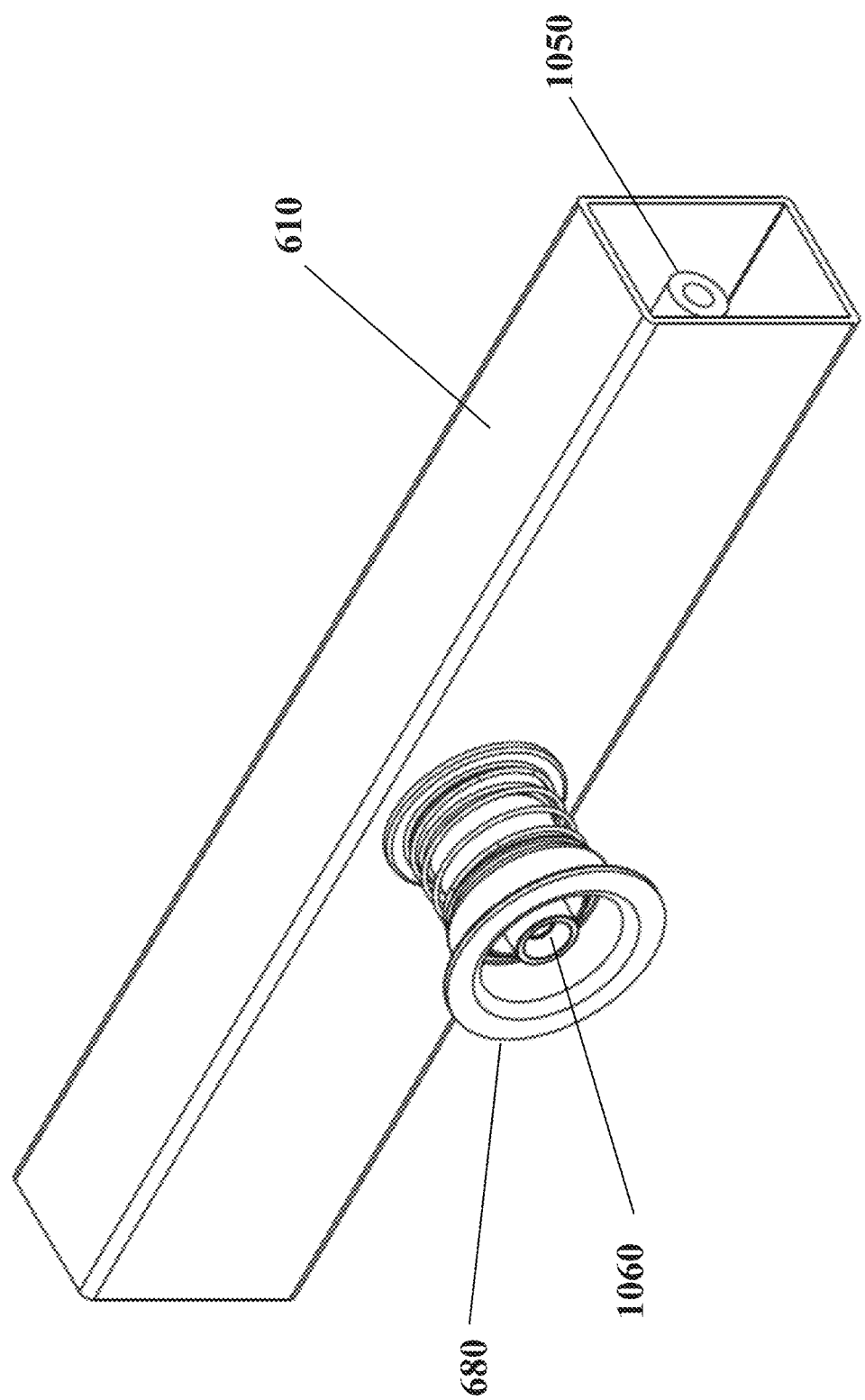
FIG. 52 is a perspective view of the embodiment of an air supply plenum shown in FIG. 50 in assembled form.
Figure 53:
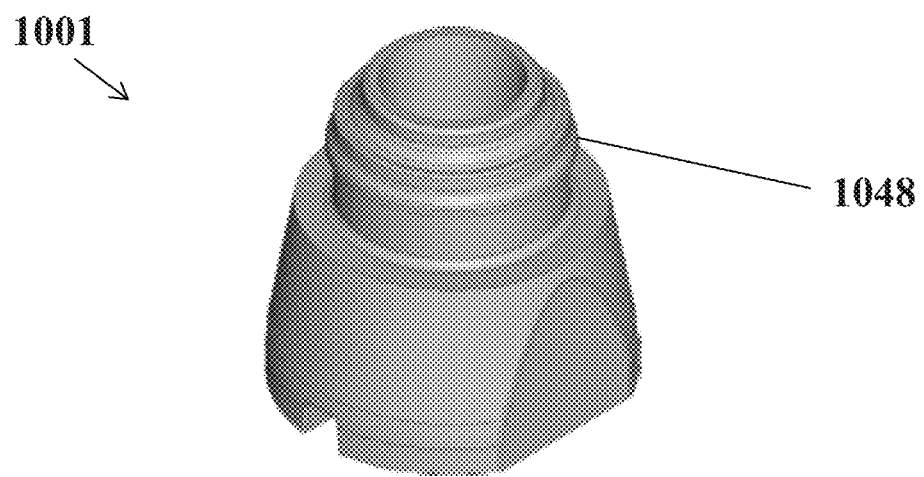
FIG. 53 is a perspective view of an embodiment of a valve body of a valve assembly.
Figure 54:
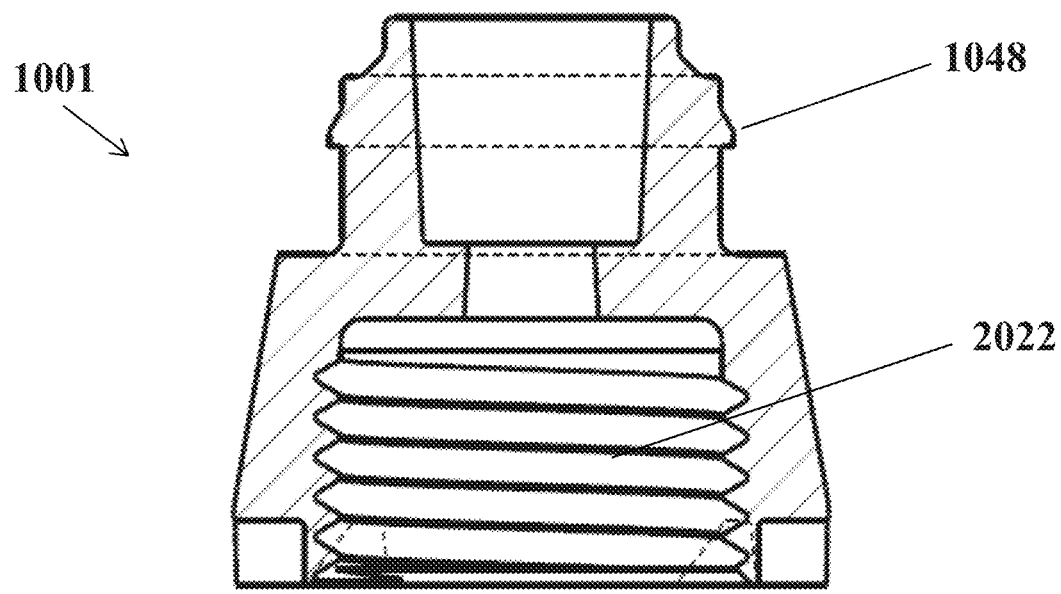
FIG. 54 is a cross-section view of an embodiment of a valve body of a valve assembly.
Figure 55:
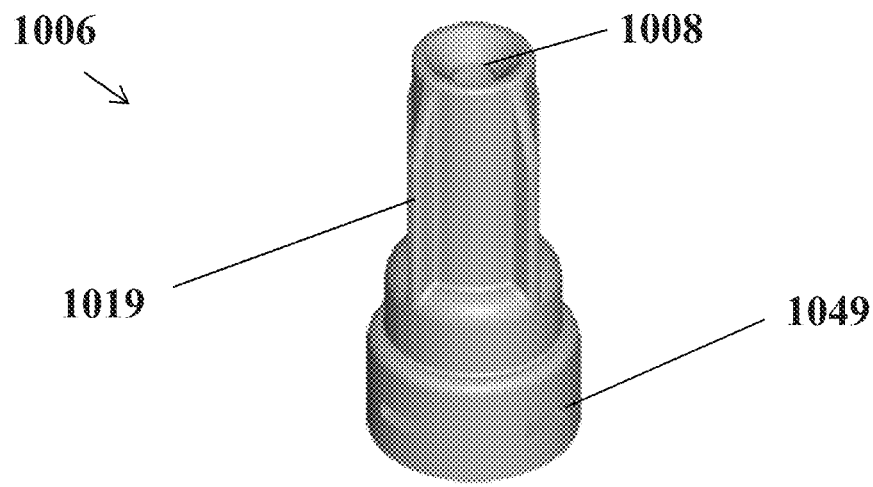
FIG. 55 is a perspective view of an embodiment of an end cap of a valve assembly.
Figure 56:
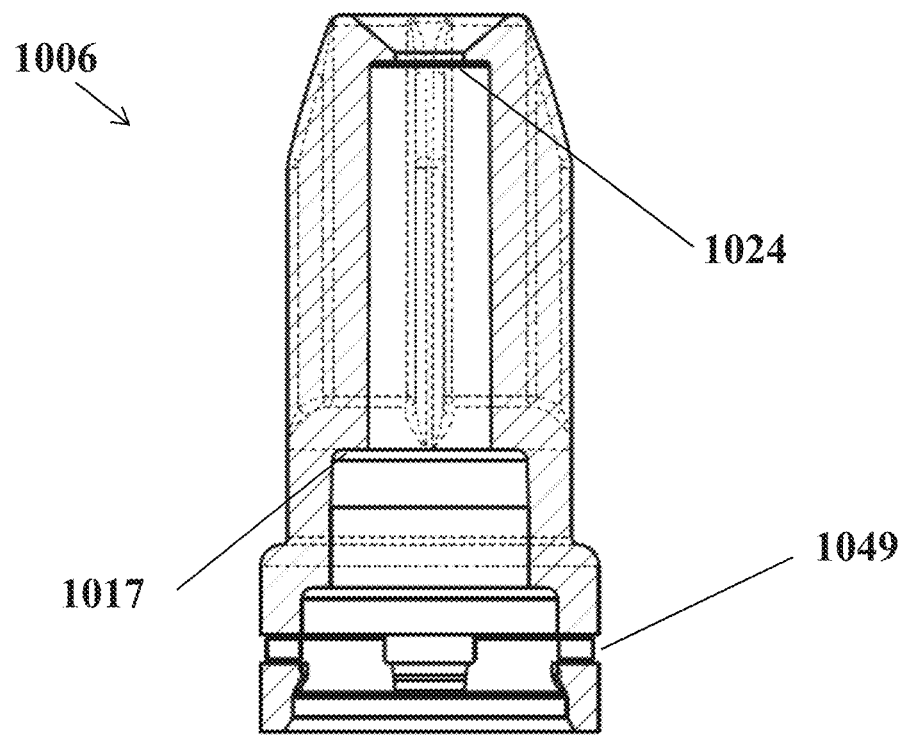
FIG. 56 is a cross-section view of an embodiment of an end cap of a valve assembly.

In some embodiments, with reference to FIGS. 46-52, two different saddle fittings can be can be placed over the water supply manifold 1050 and secured with locking rings 1090, wherein a first (front) saddle comprises a saddle fitting 1080 with fluid channel 3000 therethrough (see FIG. 46) and a second (rear) saddle comprises a closed saddle fitting 1200 having an interior wall 1230 that blocks water flow (see FIG. 49). The underside of closed saddle fitting 1200 is similar to saddle fitting 1080, having U-shaped portion 1082, grip ribs 1084 along the U-shaped curve, and sealing ribs 1085 around a protrusion 1083 configured to press fit into an aperture 1091 of the water supply manifold 1050. However, instead of attachment portion 1081 with screw threads for connecting to a QD element, closed saddle fitting 1200 has an attachment portion 1240 to which a closure element 1220 (e.g., a rear saddle mounting screw/plug with a stem portion and an enlarged head portion) may be fitted, for example, by inserting the closure 1220 at least partway into the cavity 1210 in closed saddle fitting 1200. FIG. 51 shows a cross-section view and FIG. 52 shows a perspective view of an exemplary assembly, wherein a saddle fitting 1080 and QD element 1060 are attached to the front of the manifold 1050 at air dock 680, and a closed saddle fitting 1200 and mounting screw 1220 are attached the rear of the manifold 1050, as shown in FIG. 50.

In an exemplary embodiment, in operation, water may be supplied via the water supply manifold 1050. The water may flow out of the aperture 1091 in the water supply manifold 1050, through the fluid channel 3000 in the protrusion 1083 of the attachment portion 1081 of the saddle fitting 1080, and into and through the fluid channel 2000 of the QD element 1060. When a valve stem 1020 is placed in contact with the QD element 1060 causing the QD element 1060 to open, the water is further permitted to flow through the fluid channel 4000 in valve stem 1020 into the fluid channel 1010 of the valve assembly 1000. Animals housed in the cages 1100 may, thus, access the water from the cage by causing the valve assembly 1000 to open as discussed above.

While valve assembly 1000 is described in the exemplary embodiments as being cage-mounted and implemented with automatic watering systems comprising a flexible manifold and injected molded plastic fittings, the valve assembly 1000 can also be implemented with existing automatic watering systems comprising stainless steel manifolds and fittings.

Moreover, in exemplary embodiments, the valve assembly 1000 may also be mounted to the plena or manifold of the rack rather than the cage 1100. In such configurations, the valve assembly 1000 would pass through an opening provided in the cage 1100. The opening in the cage 1100 may be closed off using a spring loaded or formed flap door. In exemplary embodiments, the cage 1100 can be made of replaceable materials.

While there have been shown and described fundamental novel features of the invention as applied to exemplary embodiments thereof, it will be understood that various omissions and substitutions and changes in the form and details of the disclosed invention may be made by those skilled in the art without departing from the spirit of the invention. Moreover, as is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there between.

What is claimed is:

1. An animal watering valve for delivering a fluid from an automatic water system to an animal housed in a cage, the valve comprising:
   a valve body and an end cap defining distal and proximal portions, respectively, of a fluid channel through the valve; and
   an actuator configured to open and close the valve, the actuator disposed at least in part in the fluid channel and comprising a plastic material,
   wherein the end cap comprises a jam-preventing opening to prevent debris from jamming the valve, the jam-preventing opening configured so that no direct path is provided into the fluid channel of the valve and only a narrow and tortuous pathway into the fluid channel of the valve is provided even when the valve is open, and
   wherein a portion of the actuator is disposed in the jam-preventing opening of the end cap, the portion of the actuator disposed in the jam-preventing opening of the end cap comprising a metal or other material that is animal chew resistant.

2. The valve of claim 1, wherein the narrow and tortuous pathway is provided by a lateral surface disposed in the fluid channel, which surface abuts a lower shoulder of the end cap when the valve is closed.

3. The valve of claim 1, wherein the portion of the actuator disposed in the jam-preventing opening of the end cap comprises stainless steel.

4. The valve of claim 1, wherein the jam-preventing opening includes an angular surface tapering inward from a proximal end of the valve.

5. The valve of claim 1, wherein a proximal end of the actuator is substantially even with a proximal end of the valve.

6. The valve of claim 1, wherein at least one of the valve body and the end cap comprise a plastic material.

7. The valve of claim 1, wherein the valve body and the end cap are configured to be joined together via snap fit.

8. The valve of claim 1, wherein at least one of the valve body, the end cap, and at least a portion of the actuator are injection molded.

9. The valve of claim 1, wherein at least one of the valve body, the end cap, and the actuator comprise polyphenylsulfone.

10. The valve of claim 1, further comprising a valve shield configured to fit over at least a portion of the valve, the valve shield comprising a metal or other material that is animal chew resistant.

11. The valve of claim 1, wherein the valve is constructed of materials that can withstand temperatures of up to about 270 degrees Fahrenheit.

12. The valve of claim 1, wherein the valve is constructed of materials that have chemical resistance properties.

13. The valve of claim 1, further comprising a porous part having a three-dimensional shape, the porous part positioned proximate a distal end of the valve to protect against foreign material and set a flow rate through the valve.

14. The valve of claim 13, wherein the porous part has a substantially cylindrical shape.

15. The valve of claim 13, wherein the porous part has a predetermined pore size.

16. The valve of claim 13, wherein the porous part has a micron rating.

17. The valve of claim 13, wherein the porous part comprises a plastic material.

\* \* \* \* \*